US010354397B2

(12) United States Patent
Davis et al.

(10) Patent No.: US 10,354,397 B2
(45) Date of Patent: Jul. 16, 2019

(54) METHODS AND APPARATUS FOR MODELING DEFORMATIONS OF AN OBJECT

(71) Applicant: Massachusetts Institute of Technology, Cambridge, MA (US)

(72) Inventors: Myers Abraham Davis, Cambridge, MA (US); Frederic Durand, Somerville, MA (US); Justin G. Chen, Lexington, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 15/068,357

(22) Filed: Mar. 11, 2016

(65) Prior Publication Data

US 2016/0267664 A1    Sep. 15, 2016

Related U.S. Application Data

(60) Provisional application No. 62/131,336, filed on Mar. 11, 2015.

(51) Int. Cl.
*G06T 7/246* (2017.01)
*G06T 13/80* (2011.01)

(52) U.S. Cl.
CPC .............. *G06T 7/251* (2017.01); *G06T 13/80* (2013.01); *G06T 2200/04* (2013.01); *G06T 2207/10016* (2013.01); *G06T 2210/44* (2013.01)

(58) Field of Classification Search
None
See application file for complete search history.

(56) References Cited

U.S. PATENT DOCUMENTS

| 6,049,619 | A | 4/2000 | Anandan et al. |
| 6,943,870 | B2 * | 9/2005 | Toyooka ............... G01B 11/162 356/35.5 |
| 7,532,541 | B2 | 5/2009 | Govindswamy et al. |
| 8,027,513 | B2 | 9/2011 | Leichter et al. |
| 8,251,909 | B2 | 8/2012 | Arnold |
| 9,172,913 | B1 | 10/2015 | Johnston |
| 9,324,005 | B2 | 4/2016 | Wadhwa et al. |
| 9,811,901 | B2 | 11/2017 | Wu et al. |

(Continued)

FOREIGN PATENT DOCUMENTS

WO    WO 2016/145406    9/2016

OTHER PUBLICATIONS

The Written Opinion for PCT/US2016/022191, titled: "Methods and Apparatus for Modeling Deformation of an Object," dated Jul. 1, 2016.

(Continued)

*Primary Examiner* — Vikkram Bali
(74) *Attorney, Agent, or Firm* — Hamilton, Brook, Smith & Reynolds, P.C.

(57) ABSTRACT

Embodiments can be used to synthesize physically plausible animations of target objects responding to new, previously unseen forces. Knowledge of scene geometry or target material properties is not required, and a basis set for creating realistic synthesized motions can be developed using only input video of the target object. Embodiments can enable new animation and video production techniques.

35 Claims, 19 Drawing Sheets
(16 of 19 Drawing Sheet(s) Filed in Color)

(56) References Cited

U.S. PATENT DOCUMENTS

| | | |
|---|---|---|
| 2003/0219146 A1 | 11/2003 | Jepson et al. |
| 2006/0158523 A1 | 7/2006 | Estevez et al. |
| 2006/0177103 A1 | 8/2006 | Hildreth |
| 2007/0002145 A1 | 1/2007 | Furukawa |
| 2008/0123747 A1 | 5/2008 | Lee et al. |
| 2008/0135762 A1 | 6/2008 | Villanucci et al. |
| 2008/0151694 A1 | 6/2008 | Slater |
| 2008/0273752 A1 | 11/2008 | Zhu et al. |
| 2009/0095086 A1 | 4/2009 | Kessler et al. |
| 2009/0121727 A1* | 5/2009 | Lynch .................... G01R 27/02 324/609 |
| 2009/0322778 A1 | 12/2009 | Dumitras |
| 2010/0079624 A1 | 4/2010 | Miyasako |
| 2010/0272184 A1 | 10/2010 | Fishbain et al. |
| 2011/0150284 A1 | 6/2011 | Son et al. |
| 2011/0221664 A1 | 9/2011 | Chen et al. |
| 2011/0222372 A1 | 9/2011 | O'Donovan et al. |
| 2011/0254842 A1 | 10/2011 | Dmitrieva et al. |
| 2012/0019654 A1 | 1/2012 | Venkatesan et al. |
| 2012/0020480 A1 | 1/2012 | Visser et al. |
| 2012/0027217 A1 | 2/2012 | Jun et al. |
| 2013/0121546 A1 | 5/2013 | Guissin |
| 2013/0147835 A1 | 6/2013 | Lee et al. |
| 2013/0272095 A1 | 10/2013 | Brown et al. |
| 2013/0301383 A1 | 11/2013 | Sapozhnikov et al. |
| 2013/0329953 A1 | 12/2013 | Schreier |
| 2014/0072190 A1 | 3/2014 | Wu et al. |
| 2014/0072228 A1 | 3/2014 | Rubinstein et al. |
| 2014/0072229 A1 | 3/2014 | Wadhwa et al. |
| 2015/0016690 A1 | 1/2015 | Freeman et al. |
| 2015/0030202 A1 | 1/2015 | Fleites et al. |
| 2015/0319540 A1 | 11/2015 | Rubinstein et al. |
| 2016/0217587 A1 | 7/2016 | Hay |
| 2016/0316146 A1 | 10/2016 | Kajimura |
| 2017/0109894 A1 | 4/2017 | Uphoff |
| 2017/0221216 A1 | 8/2017 | Chen et al. |
| 2018/0061063 A1 | 3/2018 | Chen et al. |

OTHER PUBLICATIONS

Avitabile, P., "Modal space: Back to basics," *Experimental techniques*, 26(3):17-18 (2002).
Ait-Aider, O., et al., "Kinematics from Lines in a Single Rolling Shutter Image," Proceedings of CVPR '07. 6 pages (2007).
Bathe, K.J., "Formulation of the Finiste Element Method—Linear Analysis in Solid and Structural Mechanics," *Publisher Klaus-Jurgen*, (2006).
Boll, S.F., "Suppression of Acoustic Noise in Speech Using Spectral Subtraction," IEEE Trans. Acous. Speech Sig. Proc., ASSP-27(2): 113-120 (1979).
Brincker, R. , et al., "Why output-only modal testing is a desirable tool for a wide range of practical applications," *Proc. of the International Modal Analysis Conference (IMAC) XXI*, Paper vol. 265. (2003).
Chen, J.G., et al., "Near Real-Time Video Camera Identification of Operational Mode Shapes and Frequencies," 1-8 (2015).
Chen, J.G., et al., Structural modal identification through high speed camera video: Motion magnification. *Topics in Modal Analysis* I, J. De Clerck, Ed., Conference Proceedings of the Society for Experimental Mechanics Series. Springer International Publishing, vol. 7, pp. 191-197 (2014).
Chen, J.G., et al., "Modal Identification of Simple Structures with High-Speed Video Using Motion Magnification," Journal of Sound and Vibration, 345:58-71 (2015).
Chuang, Y.-Y., et al., "Animating pictures with Stochastic Motion Textures," *AMC Trans. on Graphics—Proceedings of ACM Siggraph*, 24(3):853-860 (Jul. 2005).
Davis, A., et al., "Visual Vibrometry: Estimating Material Properties from Small Motion in Video," *The IEEE Conference on Computer Vision and Pattern Recognition* (CVPR), 2015.

Davis, A., et al. ,"The Visual Microphone: Passive Recovery of Sound From Video," *MIT CSAIL* pp. 1-10 (2014); ACM Transactions on Graphics (Proc. SIGGRAPH) 33, 4, 79:1-79:10 (2014).
Davis, A., et al., "Image-Space Modal Bases for Plausible Manipulation of Objects in Video," *ACM Transactions on Graphics*, vol. 34, No. 6, Article 239, (Nov. 2015).
De Cheveigne, A., "YIN, A Fundamental Frequency Estimator for Speech and Musica," J. Acoust. Soc. Am., 111(4): 1917-1930 (2002).
DeRoeck, G., et al., "Benchmark study on system identification through ambient vibration measurements," *In Proceedings of IMAC XVIII, the 18th International Modal Analysis Conference*, San Antonio, Texas, pp. 1106-1112 (2000).
Doretto, G., et al., "Dynamic textures," *International Journal of Computer Vision*, 51(2):91-109 (2003).
Fleet, D.J. and Jepson, A.D., "Computation of Component Image Velocity From Local Phase Information," *International Journal of Computer Vision* 5(1):77-104 (1990).
Freeman, W.T. and Adelson, E.H., "The Design and Use of Steerable Filters," *IEEE Transactions on Pattern Analysis and Machine Intelligence* 13(9):891-906 (1991).
Garofolo, J.S., et al., "DARPA TIMIT Acoustic-Phonetic Continuous Speech Corpus CD-ROM," NIST Speech Disc 1-1.1 (1993).
Gautama, T. and Val Hulle, M.M., "A Phase-Based Approach to the Estimation of the Optical Flow Field Using Spatial Filtering," *IEEE Transactions on Neural Networks* 13(5):1127-1136 (2002).
Geyer, C., et al. "Geometric Models of Rolling-Shutter Cameras," EECS Department, University of California, Berkeley, 1-8 (2005).
Grundmann, M., et al., "Calibration-Free Rolling Shutter Removal," http://www.cc.gatech.edu/cpl/projects/rollingshutter, 1-8 (2012).
Hansen, J.H.L. and Pellom, B.L., "An Effective Quality Evaluation Protocol for Speech Enhancement Algorithms," Robust Speech Processing Laboratory, http://www.ee.duke.edu/Research/Speech (1998).
Helfrick, M.N., et al., "3D Digital Image Correlation Methods for Full-field Vibration Measurement," *Mechanical Systems and Signal Processing*, 25:917-927 (2011).
Hermans, L. and Van Der Auweraer, H., "Modal Testing and Analysis of Structures Under Operational Conditions: Industrial Applications," *Mechanical and Systems and Signal Processing* 13(2):193-216 (1999).
Horn, B.K.P. and Schunck, B.G., "Determining Optical Flow," *Artificial Intelligence*, 17(1-3), 185-203 (1981).
Huang, J., et al., "Interactive shape interpolation through controllable dynamic deformation," *Visualization and Computer Graphics, IEEE Transactions* on 17(7):983-992 (2011).
James, D.L., and Pai, D.K., "Dyrt: Dynamic Response Textures for Real Time Deformation simulation with Graphics Hardware," *ACM Transactions on Graphics (TOG)*, 21(3):582-585 (2002).
James, D.L, and Pai, D.K., "Multiresolution green's function methods for interactive simulation of large-scale elastostagic objects," *ACM Transactions on Graphics (TOG)* 22(I):47-82 (2003).
Janssen, A.J.E.M., et al., "Adaptive Interpolation of Discrete-Time Signals That Can Be Modeled as Autoregressive Processes," IEEE Trans. Acous. Speech, Sig. Proc., ASSP-34(2): 317-330 (1986).
Jansson, E., et al. "Resonances of a Violin Body Studied," Physica Scripta, 2: 243-256 (1970).
Kim, S.-W. and Kim, N.-S., "Multi-Point Displacement Response Measurement of Civil Infrastructures Using Digital Image Processing," *Procedia Engineering* 14:195-203 (2011).
Langlois, T.R., et al., "Eigenmode compression for modal sound models," *ACM Transactions on Graphics (Proceedings of SIGGRAPH 2014)*, 33(4) (Aug. 2014).
Liu, C., et al., "Motion Magnification," Computer Science and Artificial Intelligence Lab (CSAIL), Massachusetts Institute of Technology (2005).
Li, S., et al., "Space-time editing of elastic motion through material optimization and reduction," *ACM Transactions on Graphics*, 33(4), (2014).
Loizou, P.C., Speech Enhancement Based on Perceptually Motivated Bayesian Estimators of the Magnitude Spectrum, IEEE Trans. Speech Aud. Proc., 13(5): 857-869 (2005).

(56) References Cited

OTHER PUBLICATIONS

Lucas, B. D. and Kanade, T., "An Iterative Image Registration Technique With an Application to Stereo Vision," *Proceedings of the 7th International Joint Conference on Artificial Intelligence*, pp. 674-679 (1981).
Morlier, J., et al., "New Image Processing Tools for Structural Dynamic Monitoring." (2007).
Nakamura, J., "Image Sensors and Signal Processing for Digital Still Cameras," (2006).
Pai, D.K., et al., "Scanning Physical Interaction Behavior of 3d Objects," *Proceedings of the 28th Annual Conference on Computer Graphics and Interactive Techniques*, ACM, New York, NY, USA, SIGGRAPH '01, pp. 87-96 (2001).
Park, J.-W., et al., "Vision-Based Displacement Measurement Method for High-Rise Building Structures Using Partitioning Approach," *NDT&E International* 43:642-647 (2010).
Patsias, S., et al., "Damage Detection using Optical Measurements and Wavelets," *Structural Health Monitoring* 1(1):5-22 (Jul. 2002).
Pentland, A. and Sclaroff, S., "Closed-form Solutions for Physically Based Shape Modeling and Recognition," *IEEE Transactions on Pattern Analysis and Machine Intelligence*, 13(7): 715-729 (Jul. 1991).
Pentland, A., and Williams. J., "Good vibrations: Modal Dynamics for Graphics and Animation," *SIGGRAPH '89 Proceedings of the 16th Annual Conference on Computer Graphics and Interactive Techniques, ACM*, vol. 23, pp. 215-222 (1989).
Poh, M.Z., et al., "Non-Contact, Automated Cardiac Pulse Measurements Using Video Imaging and Blind Source Separation," *Optics Express*, 18(10): 10762-10774 (2010).
Portilla, J. and Simoncelli, E. P., "A Parametric Texture Model Based on Joint Statistics of Complex Wavelet Coefficients," Int'l. J. Comp. Vis., 40(1): 49-71 (2000).
Poudel, U., et al., "Structural damage detection using digital video imaging technique and wavelet transformation," *Journal of Sound and Vibration* 286(4):869-895 (2005).
Powell, R.L. and Stetson, K.A., "Interferometric Vibration Analysis by Wavefront Reconstruction," J. Opt Soc. Amer., 55(12): 1593-1598 (1965).
Rothberg, S.J., et al., "Laser Vibrometry: Pseudo-Vibrations," J. Sound Vib., 135(3): 516-522 (1989).
Rubinstein, M., "Analysis and Visualization of Temporal Variations in Video," (2014).
Schödl, A., et al., "Video Textures," *Proceedings of the 27th Annual Conference on Computer Graphics and Interactive Techniques*, ACM Press/Addison-Wesley Publishing Co., New York, NY, USA, SIGGRAPH '00, pp. 489-498 (2000).
Shabana, A.A. *"Theory of Vibration,"* vol. 2., Springer (1991).
Simoncelli, E.P., et al., "Shiftable multi-scale transforms," *IEEE Trans. Info. Theory*, 2(38):587-607 (1992).
Stam, J., "Stochastic Dynamics: Simulating the effects of turbulence on flexible structures", *Computer Graphics Forum*, 16(3): C159-C164 (1996).
Stanbridge, A.B. and Ewins, D.J., "Modal Testing Using a Scanning Laser Doppler Vibrometer," Mech. Sys. Sig. Proc., 13(2): 255-270 (1999).
Sun, M., et al., "Video input driven animation (vida)," *Proceedings of the Ninth IEEE International Conference on Computer Vision—vol. 2*, IEEE Computer Society, Washington, DC, USA, 96, (2003).
Szummer, M., and Picard, R.W., "Temporal texture modeling," *IEEE Intl. Conf. Image Processing*, 3:823-836 (1996).
Taal, C.H., et al.,"An Algorithm for Intelligibility Prediction of Time-Frequency Weighted Noisy Speech," IEEE Trans. Aud. Speech, Lang. Proc., 19(7): 2125-2136 (2011).
Tao, H., and Huang, T.S., "Connected vibrations: A modal analysis approach for non-rigid motion tracking," CVPR, *IEEE Computer Society*, pp. 735-740 (1998).
Van Den Doel, K., and Pai, D.K., "Synthesis of shape dependent sounds with physical modeling," *Proceedings of the International Conference on Auditory Display* (ICAD) (1996).
Wadhwa, N., et al., "Phase-Based Video Motion Processing," *ACM Trans Graph. (Proceedings SIGGRAPH 2013)* 32(4), (2013).
Wadhwa, N., et al., "Riesz Pyramids for Fast Phase-Based Video Magnification," *Computational Photography (ICCP), IEE International Conference on IEEE* (2014).
Wu, H.-Y. , et al., "Eulerian video magnification for revealing subtle changes in the world," *ACM Trans. Graph. (Proc. SIGGRAPH)* 31 (Aug. 2012).
Zalevsky, Z., et al., "Simultaneous Remote Extraction of Multiple Speech Sources and Heart Beats from Secondary Speckles Pattern," Optic Exp., 17(24):21566-21580 (2009).
Zheng, C., and James, D.L., "Toward high-quality modal contact sound," *ACM Transactions on Graphics (TOG).*, vol. 30, ACM, 38 (2011).
The International Search Report for PCT/US2016/022191, entitled: "Methods and Apparatus for Modeling Deformations of an Object," dated Jul. 1, 2016.
Oxford English Dictionary entry for "optical," retrieved on Nov. 21, 2016 from http://www.oed.com/view/Entry/132057?redirectedFrom=optical#eid; 16 pages.
Caetano, E., et al., "A Vision System for Vibration Monitoring of Civil Engineering Structures," *Experimental Techniques*, vol. 35; No. 4; 74-82 (2011).
Chen, J. G., et al., "Long Distance Video Camera Measurements of Structures," *10th International Workshop on Structural Health Monitoring (IWSHM* 2015), Stanford, California, Sep. 1-3, 2015 (9 pages).
Chen, J. G., et al., "Developments with Motion Magnification for Structural Modal Identification through Camera Video," *Dynamics of Civil Structures*, vol. 2; 49-57 (2015).
Joshi, N., et al., "Image Deblurring using Inertial Measurement Sensors," *ACM Transactions on Graphics*, vol. 29; No. 4; 9 pages (2010).
Long, J. and Buyukorturk, O., "Automated Structural Damage Detection Using One-Class Machine Learning," *Dynamics of Civil Structures*, vol. 4; edited by Catbas, F. N., Conference Proceedings of the Society for Experimental Mechanics Series; 117-128; Springer International Publishing (2014).
Mohammadi Ghazi, R. and Buyukorturk, O., "Damage detection with small data set using energy-based nonlinear features," *Structural Control and Health Monitoring*, vol. 23; 333-348 (2016).
Park, S. H. and Levoy, M., "Gyro-Based Multi-Image Deconvolution for Removing Handshake Blur," *Computer Vision and Pattern Recognition (CVPR)*, Columbus, Ohio; 8 pages (2014).
Smyth, A. and Meiliang, W., "Multi-rate Kalman filtering for the data fusion of displacement and acceleration response measurements in dynamic system monitoring," *Mechanical Systems and Signal Processing*, vol. 21; 706-723 (2007).
Sohn, H., et al., "Structural health monitoring using statistical pattern recognition techniques," *Journal of Dynamic Systems, Measurement, and Control*, vol. 123; No. 4; 706-711 (2001).
Vendroux, G and Knauss, W. G., "Submicron Deformation Field Measurements: Part 2. Improved Digital Image Correlation," Experimental Mechanics; vol. 38; No. 2; 86-92 (1998).
Alam, S. et al., "Considerations of handheld respiratory rate estimation via a stabilized Video Magnification approach," Engineering in Medicine and Biology Society (EMBC), 2017 39th Annual International Conference of the IEEE. IEEE, 2017.
Jobard, B. et al., "Lagrangian-Eulerian advection of noise and dye textures for unsteady flow visualization," IEEE Transactions on Visualization and Computer Graphics 8.3 (2002): 211-222.
Nunez, A. et al., "A space-time model for reproducing rain field dynamics." (2007): 175-175.
Shi, G. and Luo, G., "A Streaming Motion Magnification Core for Smart Image Sensors," IEEE Transactions on Circuits and Systems II: Express Briefs (2017).
Wang, W. et al., "Exploiting spatial redundancy of image sensor for motion robust rPPG," IEEE Transactions on Biomedical Engineering 62.2 (2015): 415-425.

* cited by examiner

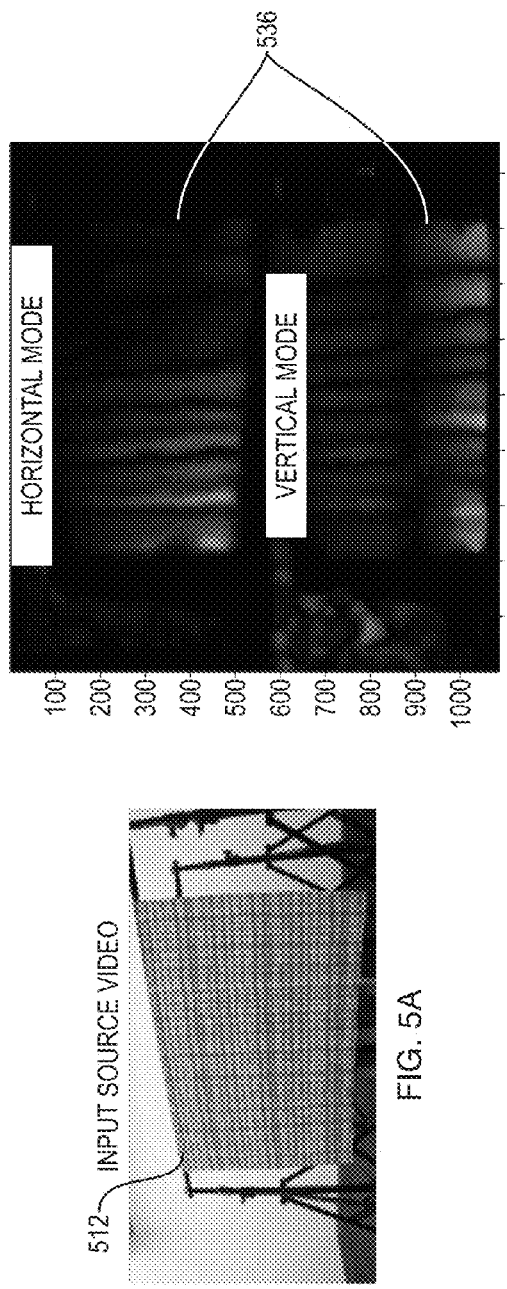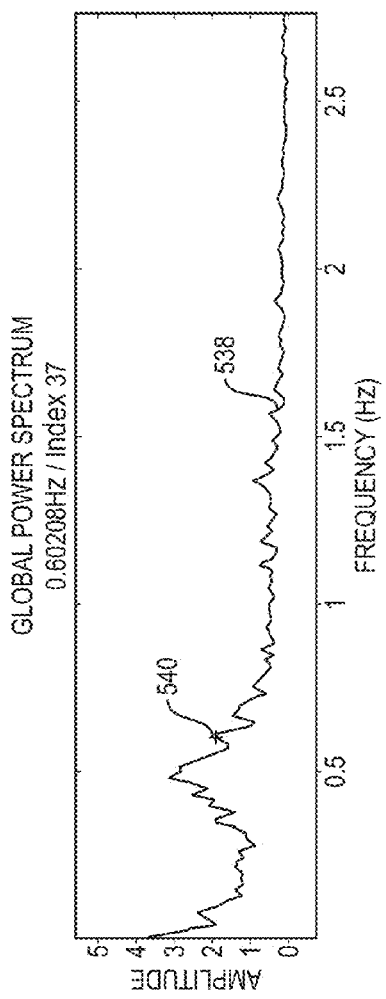
FIG. 5A — INPUT SOURCE VIDEO
FIG. 5B
FIG. 5C

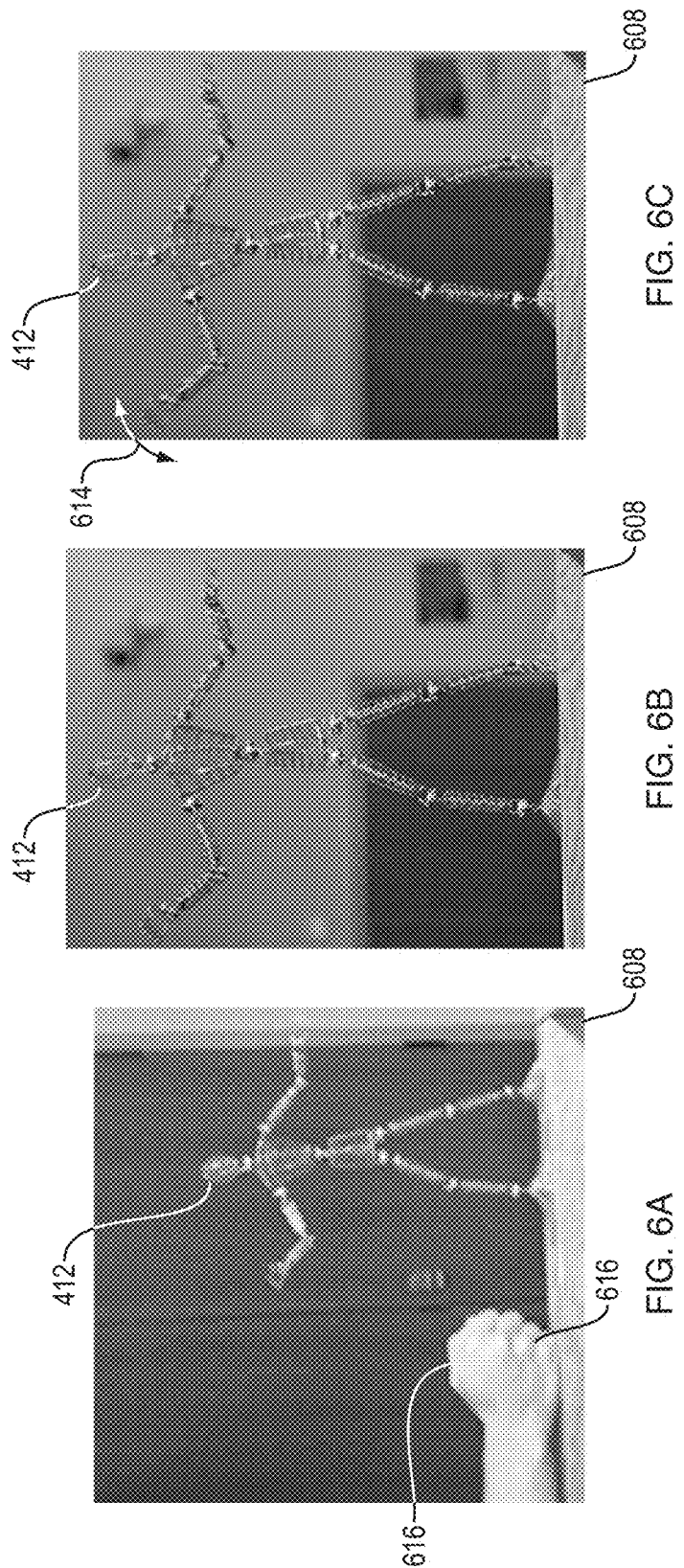

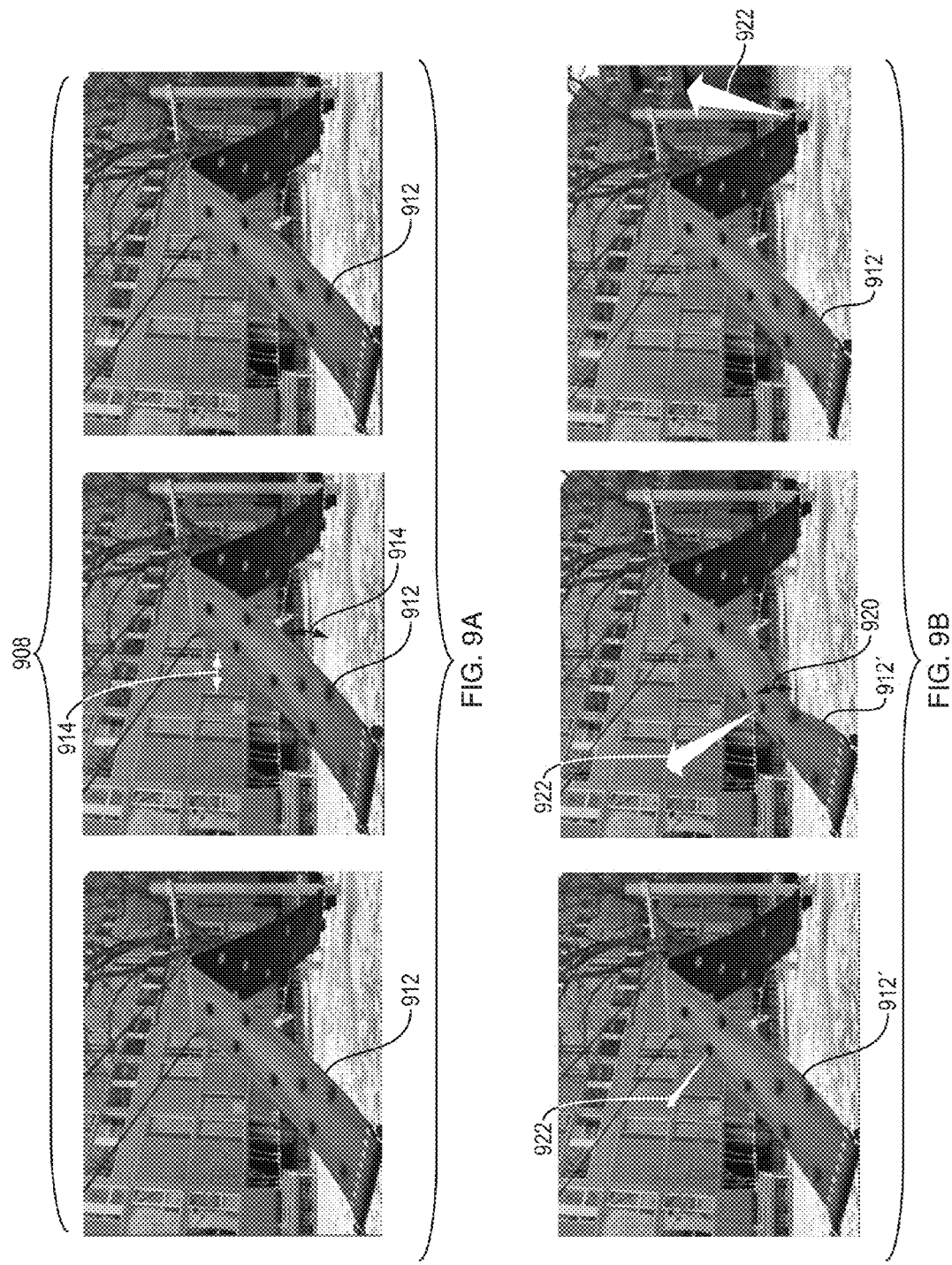

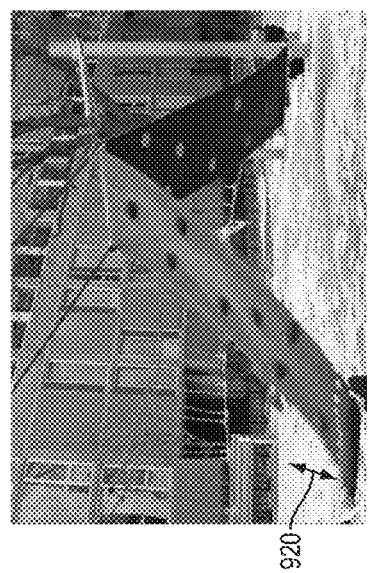
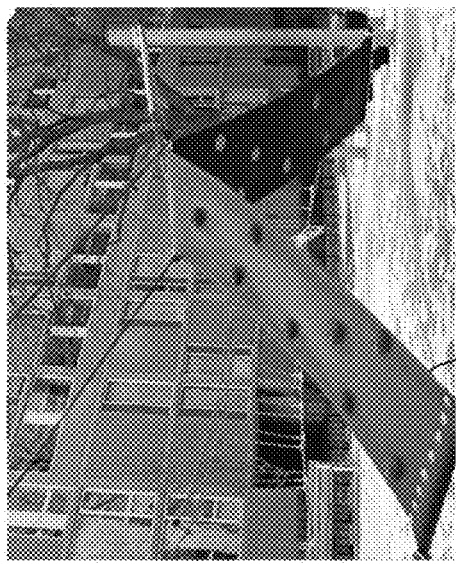
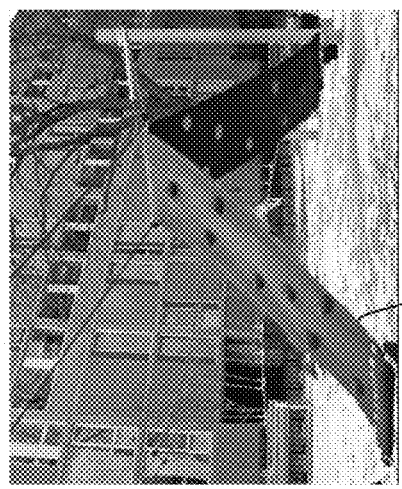
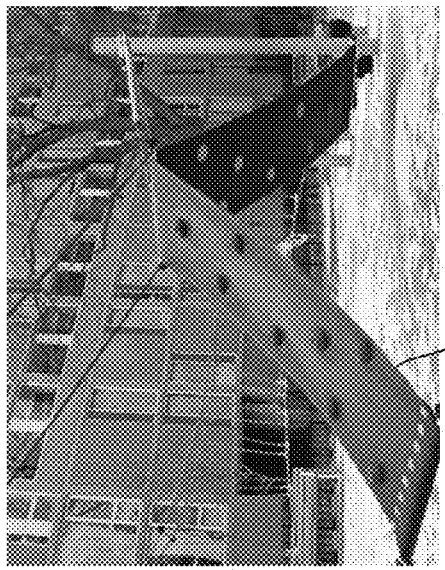
FIG. 9D

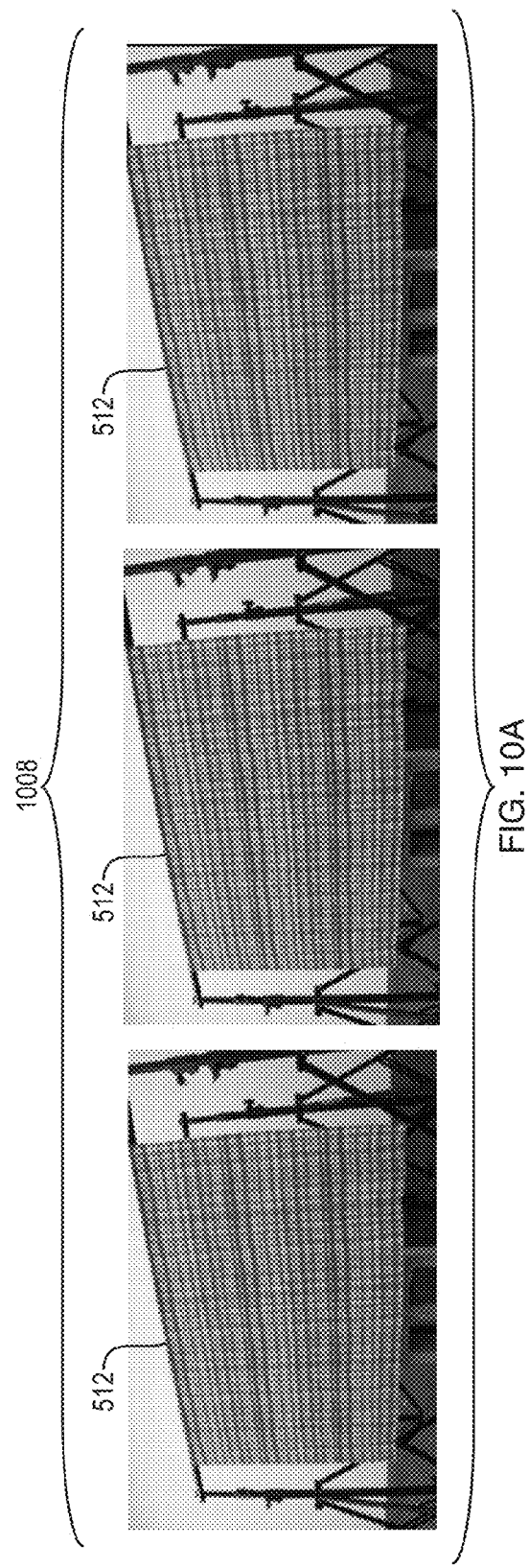

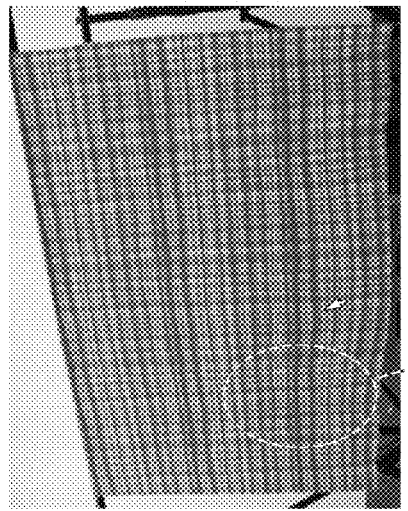
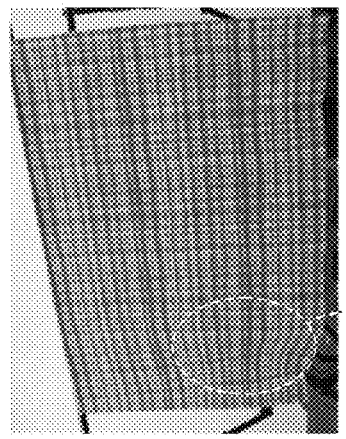
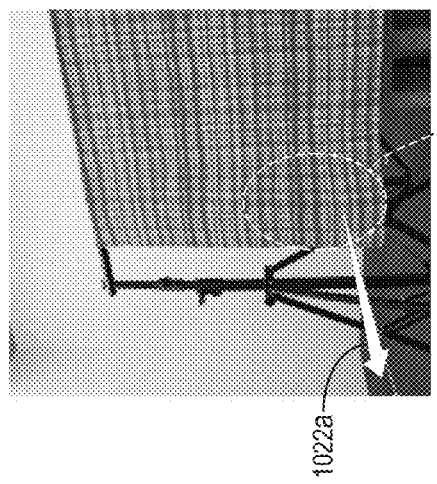
FIG. 10B
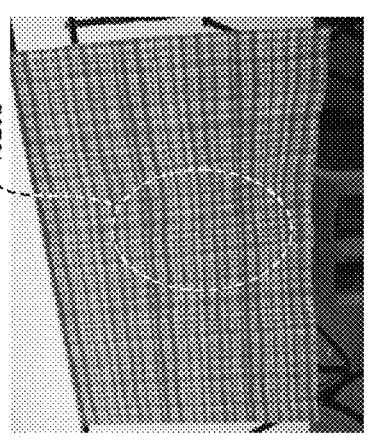
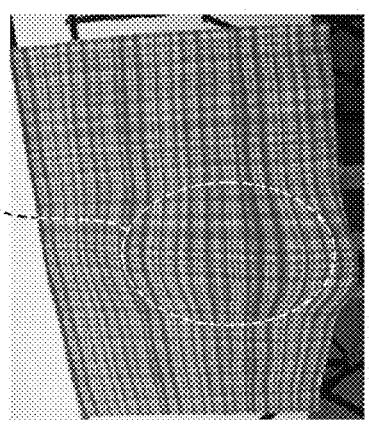
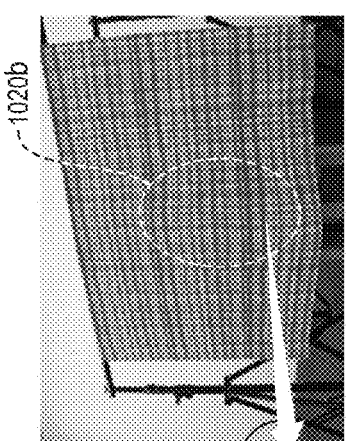
FIG. 10C

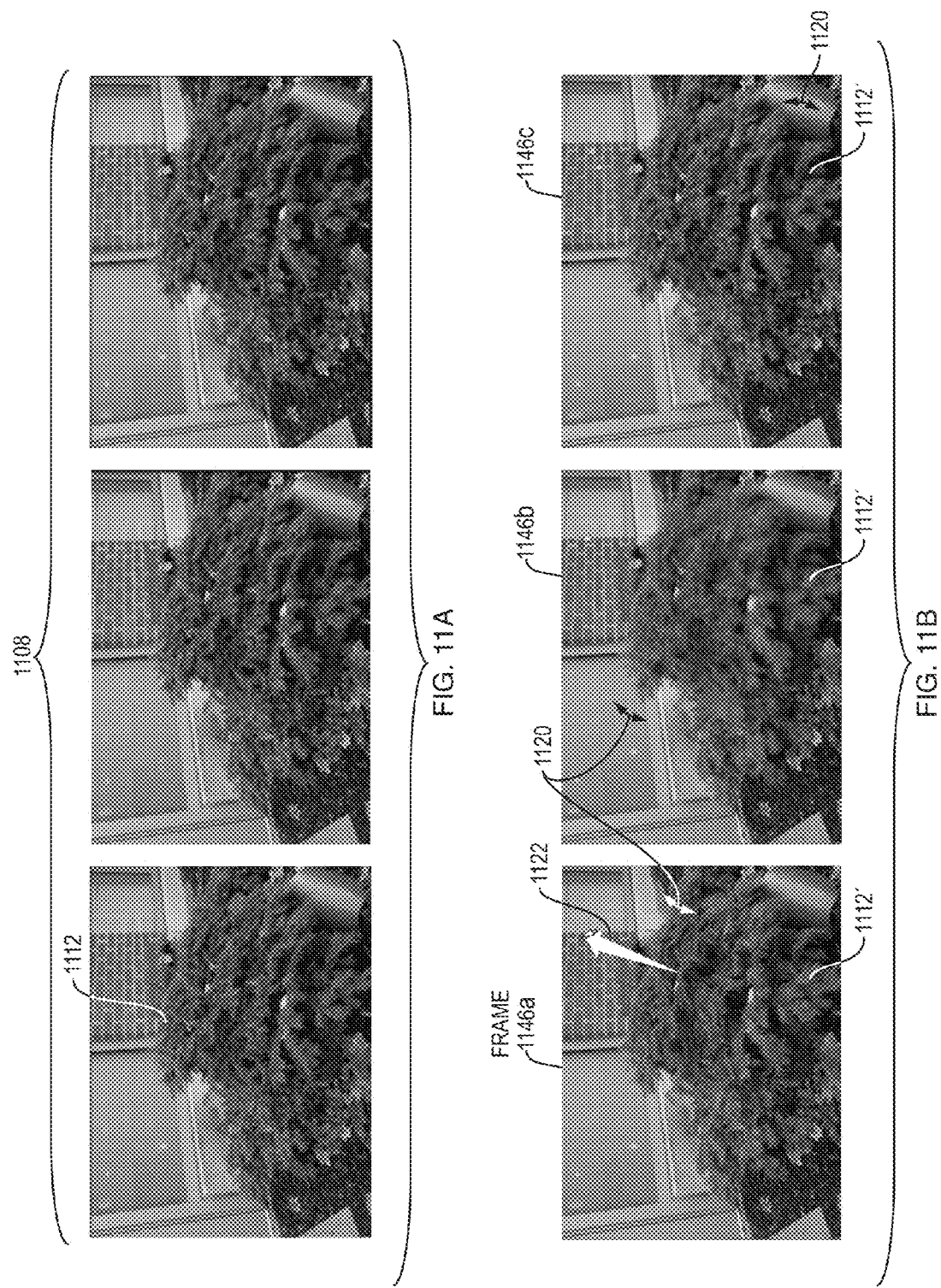

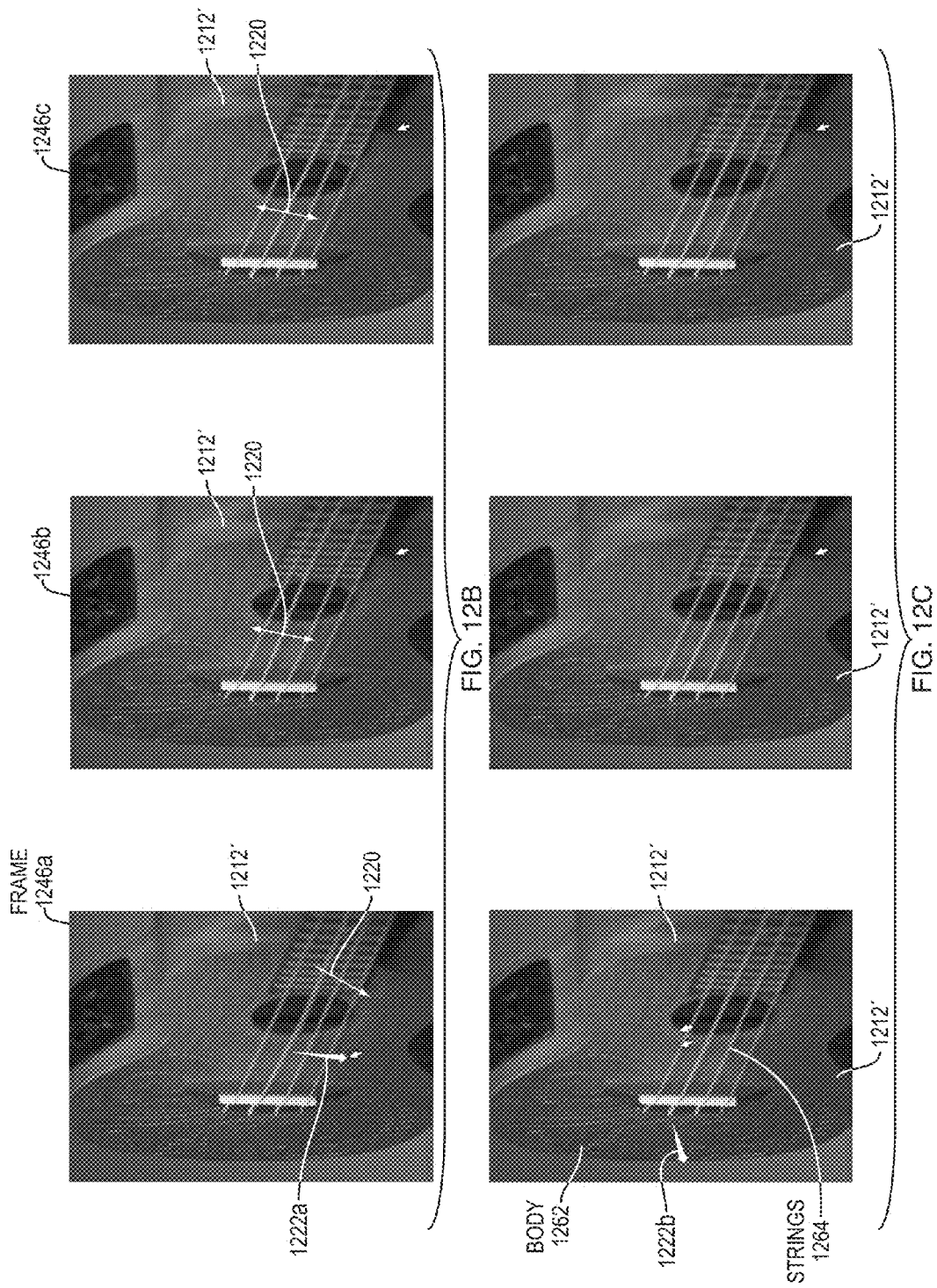

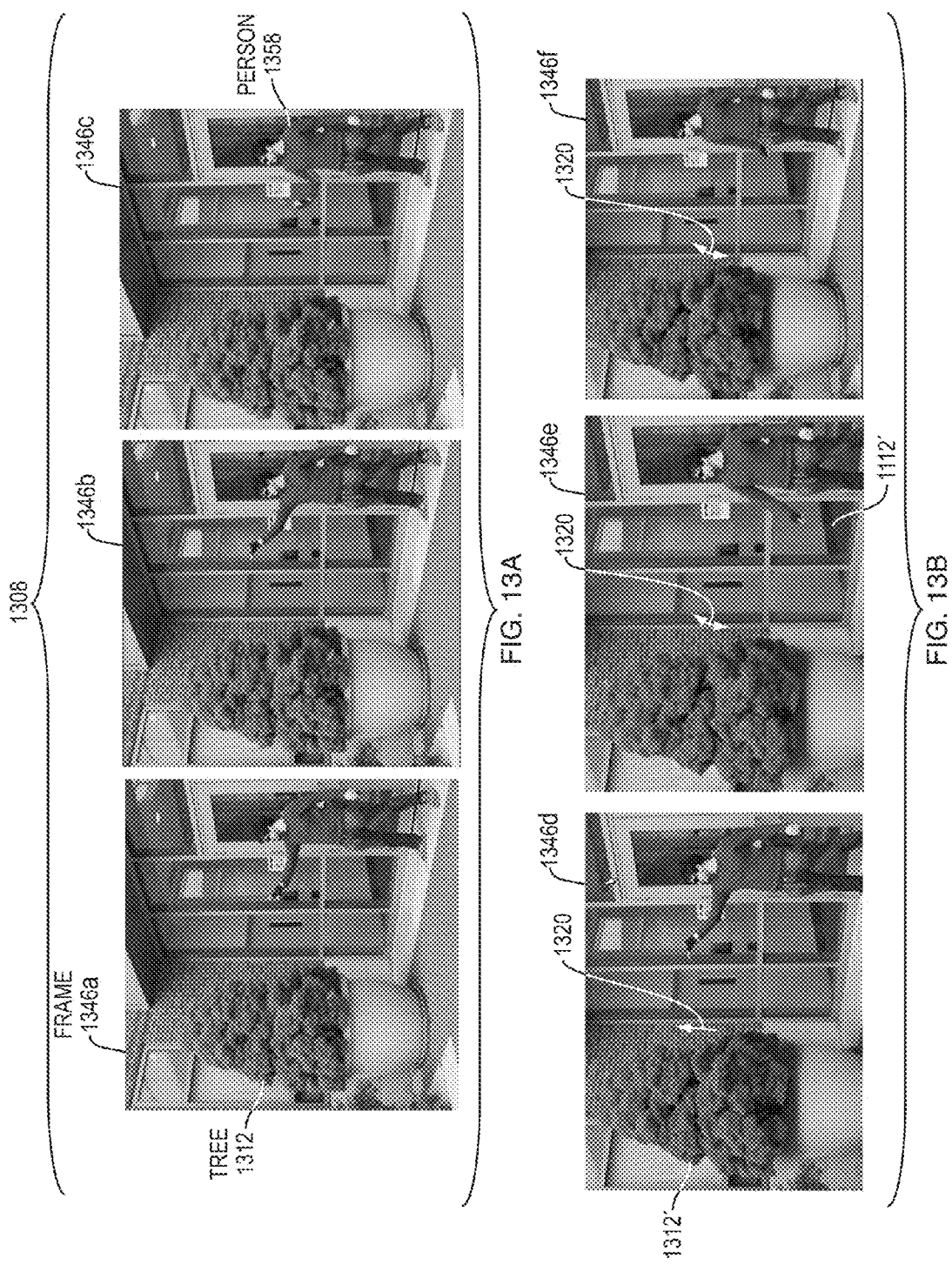

| EXAMPLE | SOURCE | SOURCE LENGTH(S) | FRAMERATE (fps) | RESOLUTION | EXCITATION | NUMBER OF MODES | FREQUENCY RANGE |
|---|---|---|---|---|---|---|---|
| BUSH | SLR | 80.18 | 60 | 640 x 480 | AMBIENT/WIND | 77† | 1.3 - 4.2 Hz |
| PLAYGROUND | SLR | 53.85 | 60 | 1280 x 720 | IMPULSE | 34† | 0.8 - 22 Hz |
| CLOTH | SLR | 59.77 | 30 | 1920 x 1080 | AMBIENT/WIND | 147† | 0.3 - 0.8 Hz |
| WIREMAN | SLR | 5.82 | 60 | 720 x 1280 | IMPULSE | 6 | 5 - 20 Hz |
| UKELELE | HIGH-SPEED CAMERA | 8.87 | 1400 | 432 x 576 | SOUND | 13 | 219 - 670 Hz |
| FORCE TREE | SLR | 35 | 60 | 1280 x 720 | IMPULSE | 13 | 0.6 - 9 Hz |

† RANGE OF FREQUENCIES SELECTED

METHODS AND APPARATUS FOR MODELING DEFORMATIONS OF AN OBJECT

RELATED APPLICATION(S)

This application claims the benefit of U.S. Provisional Application No. 62/131,336, filed on Mar. 11, 2015. The entire teachings of the above application(s) are incorporated herein by reference.

GOVERNMENT SUPPORT

This invention was made with government support under IIS-140122 from the National Science Foundation. The government has certain rights in the invention.

BACKGROUND

Computational photography seeks to capture richer information about the world and provide new visual experiences. One of the most important ways that people experience their environment is by manipulating it: pushing, pulling, poking, and prodding to test hypotheses about their surroundings. By observing how objects respond to forces that can be controlled, people learn about their dynamics. Unfortunately, video does not afford this type of manipulation because typically only the dynamics that were recorded can be observed.

Most techniques for physically-based animation derive the properties that govern object dynamics from known virtual models. However, measuring these properties for objects in the real world can be extremely difficult, and estimating them from video alone is severely underconstrained.

In film special effects, where objects sometimes are represented as responding to virtual forces, it is common to avoid the problems of modeling the dynamics of real objects by compositing human performances into virtual environments. Performers then act in front of a green screen, and their performance is later composited with computer-generated objects that are easy to simulate. While this approach can produce compelling results, it still requires considerable effort. In particular, virtual objects must be modeled, their lighting and appearance must be made consistent with any real video footage being used, and their dynamics must be synchronized with a live performance.

SUMMARY

A way of modeling real objects that is fast, easy, and produces physically plausible results is needed. Described herein are apparatus and methods for modeling real-world target objects that need not rely on physical information about the target object and can be completed based on video of the target object alone, if desired. As disclosed herein, videos can contain enough information to locally predict how recorded objects will respond to new forces not observed in the input video. A video alone can be used to create an image-space model of object dynamics around a rest state, such that short video clips can be used to quickly develop physically plausible animations that can be interactive if desired.

Methods for extracting an image-space representation of object structure from video and using it to synthesize physically plausible animations of objects responding to new, previously unseen forces are disclosed herein. Representations of a target object's structure can derived from an image-space analysis of modal object deformation. Projections of motion modes of 3D objects can be observed directly in video, and even non-orthogonal projections can still be used as a basis to simulate the dynamics of objects in image-space.

In one embodiment, a method of modeling deformations of a real-world target object includes determining an image-space modal deformation basis set representative of real-world motions of the real-world target object. The determination of the basis set is made from a sequence of images of the target object. The method also includes creating synthesized, image-space deformations of the real-world target object in response to a virtual input force hypothetically applied to the target object. The creation of the synthesized deformations is based on the modal deformation basis set.

Determining the image-space modal deformation basis set can include one or more of various actions, such as: selecting basis frequencies from an average power spectrum of frequencies averaged over at least a spatial portion of the sequence of images; calculating two-dimensional (2D), non-orthogonal projections of orthogonal, three-dimensional (3D) deformation modes; treating image-space motion in a 2D image plane as a linear projection of any linear motion of the target object in 3D space; applying additional information about the real-world target object or applying additional information about real-world forces acting on the real-world target object during an acquisition of the sequence of images; and extracting motion signals representative of the real-world motions from the sequence of images. Extracting the motion signals from the sequence of images can further include using a complex steerable pyramid (CSP).

Determining the image-space modal deformation basis set can also include one or more of other actions, such as: distinguishing between independent motion modes by relying on separation of the modes in the frequency domain; extracting, from the sequence of images, a static representation of one or more vibration modes of the real-world target object; and filtering unwanted sources of motion from the sequence of images. Filtering unwanted sources of motion from the sequence of images can further include one or more of: selecting a portion of a power spectrum of motion frequencies from the sequence of images; and masking a spatial region of the sequence of images that does not include the target object.

Determining the image-space modal deformation basis set can be performed at a network server and operate on the sequence of images of the target object received via a network path. The method can further include uploading the sequence of images to a server or downloading the deformation basis set or image-space deformations from the server.

Creating synthesized deformations can include one or more of: calculating virtual, 3D deformations; and warping an image representing a rest state of the real-world target object. Warping the image representing the rest state can include applying a displacement field calculated as a superposition of mode shapes weighted by respective modal coordinates without relying on a complex steerable pyramid (CSP) for synthesis.

The real-world motions of the real-world target object can be 3D motions, and the image-space modal deformation basis set can be a 2D basis set. Creating the synthesized deformations can further include calculating synthesized 2D deformations based on the 2D basis set.

Creating the synthesized, image-space deformations can include calculating the image-space deformations in response to the virtual input force, with the virtual input force being a point force specified to be hypothetically applied at a given point on the target object in a specified direction, or with the virtual input force being a point position or point velocity specified for a given point on the target object.

The virtual input force can include a force from a hypothetical object interacting with the target object, and the method can further include enabling generation of, or actually generating, an animation of the hypothetical object interacting with the target object. The virtual input force can be a force hypothetically applied to the target object by a real-world source object, and the method can further include enabling generation of, or actually generating, a synthesized video including representations of the synthesized, image-space deformations of the real-world target object interacting with the real-world source object based on the virtual input force. The virtual input force can be a new force differing from any force observed acting on the real-world target object in the sequence of images.

The method can further include enabling a user to specify the virtual input force using a graphical user interface (GUI) or other computer input.

In another embodiment, an apparatus for modeling deformation of a real-world target object includes memory configured to store a sequence of images of a real-world target object. The apparatus also includes a processor configured to: determine an image-space modal deformation basis set representative of real-world motions of the real-world target object from the sequence of images; and create synthesized, image-space deformations of the real-world target object, based on the modal deformation basis set, in response to a virtual input force hypothetically applied to the target object.

The processor can be further configured to determine the image-space modal deformation basis set by performing one or more of the following: enabling selection of basis frequencies from an average power spectrum of frequencies averaged over at least a spatial portion of the sequence of images; calculating (2D), non-orthogonal projections of orthogonal, three-dimensional (3D) deformation modes; treating image-space motion in a 2D image plane as a linear projection of any linear motion of the target object in 3D space; applying additional information about the real-world target object; applying additional information about a real-world force acting on the real-world target object during an acquisition of the sequence of images; and extracting motion signals representative of the real-world motions from the sequence of images. Extracting the motion signals from the sequence of images can be done by the processor using a complex steerable pyramid (CSP).

The processor can be further configured to determine the image-space modal deformation basis set by performing one or more of the following: distinguishing between independent motion modes by relying on separation of the modes in the frequency domain; extracting, from the sequence of images, a static representation of one or more vibration modes of the real-world target object; and filtering unwanted sources of motion from the sequence of images. Filtering the unwanted sources of motion using the processor can be performed by one or more of: selecting a portion of a power spectrum of frequencies from the sequence of images; and masking a spatial region of the sequence of images that does not include the target object.

The apparatus can further include a communications interface configured to perform one or more of: receiving the sequence of images of the target object via a network path; and receiving the deformation basis set or image-space deformations via a network path.

The processor can also be configured to create the synthesized deformations by calculating virtual, 3D deformations.

The apparatus of claim 25, wherein the real-world motions of the real-world target object are 3-D motions, wherein the image-space modal deformation basis set is a 2D basis set, and wherein the processor is further configured to create the synthesized deformations by calculating synthesized 2D deformations based on the 2D basis set.

The processor can be further configured to synthesize the image-space deformations by warping an image representing a rest state of the real-world target object. The warping can be done by the processor by applying a displacement field calculated as a superposition of mode shapes weighted by respective modal coordinates without relying on a complex steerable pyramid (CSP) for synthesis.

The processor can also be configured to create the synthesized, image-space deformations in response to the virtual input force, where the virtual input force includes at least one of: a point force specified to be hypothetically applied at a given point on the target object in a specified direction; and a point position or point velocity specified for a given point on the target object.

The virtual input force can include a force from a hypothetical object interacting with the target object, and the processor can be further configured to enable generation of an animation of the hypothetical object interacting with the target object. The virtual input force can be hypothetically applied to the target object by a real-world source object, and the processor can be further configured to enable generation of a synthesized video including representations of the synthesized, image-space deformations of the real-world target object interacting with the real-world source object based on the virtual input force. The virtual input force can be a new force differing from any force acting on the real-world target object in the sequence of images.

The processor can be further configured to enable a user to specify the virtual input force using a graphical user interface (GUI).

In yet another embodiment, a method of modeling deformations of a real-world target object includes means for determining an image-space modal deformation basis set representative of real-world motions of the real-world target object. The determination of the basis set is made from a sequence of images of the target object. The method also includes means for creating synthesized, image-space deformations of the real-world target object in response to a virtual input force hypothetically applied to the target object. The creation of the synthesized deformations is based on the modal deformation basis set.

In still another embodiment, a method of modeling deformations of a real-world target object includes determining an image-space modal deformation basis set representative of real-world motions of the real-world target object from a sequence of images of the target object. The image-space modal deformation basis set is configured to be used to create synthesized, image-space deformations of the real-world target object, based on the modal deformation basis set, in response to a virtual input force hypothetically applied to the target object.

In still a further embodiment, a method of creating a synthesized image of a real-world target object includes creating synthesized, image-space deformations of a real-world target object, based on an image-space modal deformation basis set, in response to a virtual input force hypothetically applied to the target object. The image-space modal deformation basis set is representative of real-world motions of the real-world target object and is determined from a sequence of images of the target object.

In a further embodiment, a synthesized image is prepared by a process comprising the steps of: (i) determining an image-space modal deformation basis set representative of real-world motions of the real-world target object from a sequence of images of the target object; and (ii) creating synthesized, image-space deformations of the real-world target object, based on the modal deformation basis set, in response to a virtual input force hypothetically applied to the target object.

In yet a further embodiment, a synthesized image of a real-world target object includes an image of the real-world target object with synthesized deformations of one or more portions of the real-world target object applied to the image based on: (i) an image-space modal deformation basis set representative of real-world motions of the real-world target object captured in a sequence of images of the real-world target object; and (ii) a virtual input force hypothetically applied to the target object.

BRIEF DESCRIPTION OF THE DRAWINGS

The patent or application file contains at least one drawing executed in color. Copies of this patent or patent application publication with color drawings will be provided by the Office upon request and payment of the necessary fee.

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 4A is a sequence of images of the wireman, along with a mask applied to the images. FIG. 4B is an illustration showing various image-space modal deformation shapes extracted from the input video in FIG. 4A. FIG. 4C is a flow diagram illustrating an embodiment process for creating synthesized, image-space deformations of the wireman target object based on the modal deformation basis set illustrated in FIG. 4B and on a virtual input force hypothetically applied to the wireman target object. FIG. 4D is a series of synthesized images showing synthesized, image-space deformations of the wireman object in response to various virtual input forces hypothetically applied to the wireman object.

FIG. 5A is a photograph (image) of a cloth hanging from a beam and used as a target object to test embodiments.

FIG. 5B is an illustration of mode shapes forming part of a deformation basis set extracted from a series of images of the cloth in FIG. 5A.

FIG. 5C is a graph showing a power spectrum for motion frequencies observed in a sequence of images of the cloth shown in FIG. 5A.

FIGS. 6A-6C are images showing motion of the wireman of FIG. 4A captured at various times. FIG. 6A shows an impulse force used to excite the motion in the wireman, and FIGS. 6B-6C show continuing motion following the excitation.

FIG. 9A is a sequence of images obtained by a video camera while applying real impulse forces to the playground structure. The sequence of images was used to determine an image-space modal deformation basis set representative of the real motions of the playground observed in the sequence of images.

FIGS. 9B-9C include a collection of images showing synthesized, image-space deformations of the playground shown in FIG. 9A in response to various virtual input forces hypothetically applied to the playground, with the virtual input forces being applied as point forces.

FIG. 9D is a series of images showing synthesized, image-space deformations of the playground shown in FIG. 9A, with the playground continuing to move in reaction to various virtual input forces similar to those illustrated in FIGS. 9B-9C.

FIG. 10A is a sequence of images from a video of the suspended cloth shown in FIG. 5A. The sequence of images was used to determine a deformation basis set for the cloth.

FIG. 10B is a series of images illustrating synthesized deformations of the cloth shown in FIG. 10A in response to a virtual input force hypothetically applied as a specified direct manipulation.

FIG. 10C is a series of images illustrating synthesized deformations of the cloth shown in FIG. 10A in response to a virtual input force hypothetically applied to the cloth as a specified point force.

FIG. 11A is a sequence of images of a bush used to determine a deformation basis set for the bush's motion.

FIG. 11B is a sequence of images showing synthesized deformations of the bush shown in FIG. 11A in response to a virtual input force hypothetically applied as a specified direct manipulation of the bush.

FIG. 12B is a series of images showing synthesized deformations of the ukulele shown in FIG. 12A in response to a virtual input force hypothetically applied to a string of the ukulele as a specified direct manipulation.

FIG. 12C is a series of images showing synthesized deformations of the ukulele shown in FIG. 12A in response to a virtual input force hypothetically applied to the body of the ukulele as a direct manipulation force.

FIG. 13A is a sequence of images of a tree obtained from a video of the tree and a person pretending to be able to apply force to the tree at a distance. The sequence of images was used to determine an image-space modal deformation basis set representative of motions of the tree caused by real impulse forces applied to the tree during acquisition of the video.

FIG. 13B is a series of synthesized images showing synthesized deformations of the tree in response to virtual input forces hypothetically applied to the tree synchronously with the motions of the person (real-world source object) shown in FIG. 13A. FIG. 13B illustrates the results of creating synthesized video with representations of synthesized deformations of a real-world target object interacting with a real-world source object based on a virtual input force.

DETAILED DESCRIPTION

Figure 1:
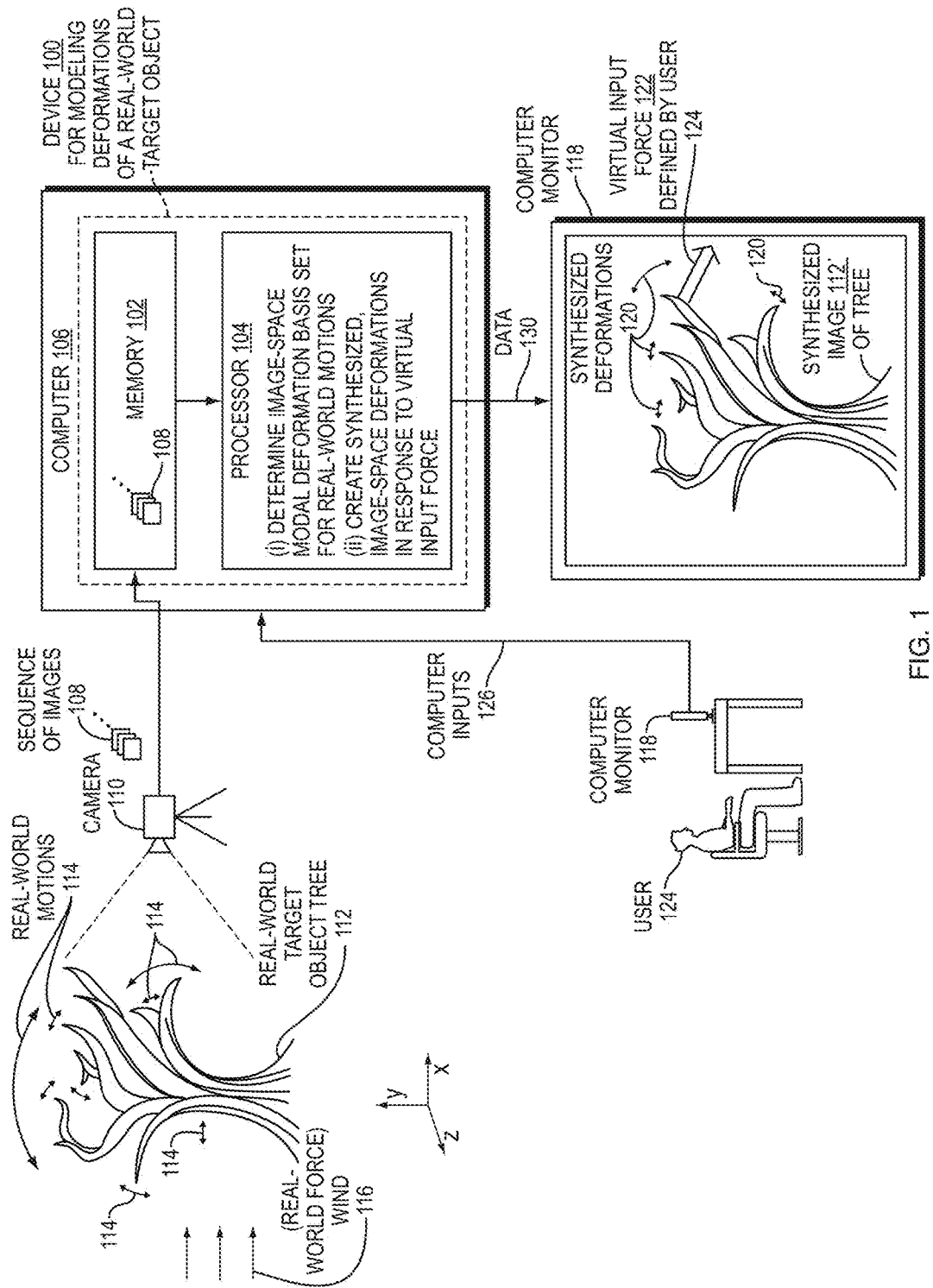
FIG. 1 is a schematic diagram illustrating an embodiment device for modeling deformations of a real-world target object, along with an environment in which it may be used.

A description of example embodiments of the invention follows.

Introduction

Computational photography seeks to capture richer information about the world, and provide new visual experiences. One of the most important ways that people experience their environment is by manipulating it: pushing, pulling, poking, and prodding to test hypotheses about their surroundings. By observing how objects respond to forces that can be controlled, people learn about their dynamics. Unfortunately, video does not afford this type of manipulation it limits us to observing the dynamics that were recorded. However, as described herein, many videos contain enough information to predict locally how recorded objects will respond to new, unseen forces. This information can be used to build image-space models of object dynamics around a rest state, resulting in turning short video clips into physically plausible, interactive animations.

Most techniques for physically-based animation derive the properties that govern object dynamics from known, virtual models. However, measuring these properties for objects in the real world can be extremely difficult, and estimating them from video alone is severely underconstrained. A key observation herein is that there is often enough information in video to create a physically plausible model of object dynamics around a rest state in which the object is filmed, even when fundamental ambiguities make recovering a general or fully-accurate model impossible. It is described herein how to extract these physically plausible models from short video clips. Their use in different types of applications is also described.

With regard to interactive animation, video makes it easy to capture the appearance of one's surroundings, but offers no means of physical interaction with recorded objects. In the real world, such interactions are a crucial part of how people understand the physical properties of objects. By building a model of dynamics around the state in which an object is filmed, embodiment methods and apparatus can be used to turn videos into interactive animations that users can explore with virtual forces that they control.

With regard to special effects in film, where objects often need to respond to virtual forces, it is common to avoid modeling the dynamics of real objects by compositing human performances into virtual environments. Performers act in front of a green screen, and their performance is later composited with computer-generated objects that are easy to simulate. This approach can produce compelling results, but requires considerable effort. In particular, virtual objects must be modeled, with their lighting and appearance made consistent with any real footage being used, and their dynamics need to be synchronized with a live performance. Disclosed embodiments address many of these challenges by making it possible to apply virtual forces directly to objects as they appear in video.

Embodiments described herein can be based on the same linear modal analysis behind many techniques in physically-based animation. However, unlike most of these techniques, embodiments described herein need not assume any knowledge of object geometry or material properties and, therefore, do rely on finite element model (FEM) methods to derive a modal basis for simulation. Instead, non-orthogonal projections of an object's vibration modes can be observed directly in video. To do this, a relationship between projected modes and the temporal spectra of optical flow is derived. It is then shown that, even if non-orthogonal, these projections can still be used as a basis to simulate image-space object dynamics. Recovering accurate physical models of objects in video is severely underconstrained. To deal with this potential ambiguity, some further assumptions can be made, and these assumptions are further described hereinafter.

As used herein, "virtual input force" can include any hypothetical manipulation hypothetically applied to the target object to obtain the synthesized, image-space deformations of the real-world target object. In one example, a "virtual input force" includes a scalar force hypothetically applied at a given point on the target object (i.e., image of the target object) in a given direction, as specified by a user who is using an image-space modal deformation basis set representative of the real-world motions of the target object. However, in another example, a "virtual input force" includes a specified position or velocity of a given point on the target object (i.e., image of the target object). These variations are further described hereinafter.

As used herein, synthesized, image-space deformations can include either static or dynamic deformations.

As used herein, a "hypothetical object" is an object that does not exist in the real-world sequence of images. Thus, a "hypothetical object," as used herein, can include an animated character digitally created, as well as a hypothetical object created and placed in a synthesized video showing the synthesized, image-space deformations of the real-world target object. A "hypothetical object" can also include a real object that does not appear in the real-world sequence of images and is added to the synthesized video.

Differences from Related Work

Physically-based Animation: Many existing techniques in physically based animation use modal analysis to reduce the degrees of freedom in deformable body. These techniques work by first deriving orthogonal vibration modes from known geometry using finite element method (FEM)

approaches. As high frequency modes generally contribute less to an object's deformation, they can often be discarded to obtain a lower dimensional basis for faster simulation.

Embodiments described herein can use a similar reduced modal basis to simulate objects in video, but there is no need to assume knowledge of scene geometry, and FEM approaches are not required to compute vibration modes. Instead, embodiments use projections of these modes directly in video. Even when non-orthogonal, these projections (often 2D projections) used in embodiments can still be used as a basis to simulate the dynamics of objects in image-space.

Observing Vibration Modes: The problem of directly observing vibration modes has been explored in several engineering disciplines, where the structure of objects must be carefully validated in the real world, even when a virtual model is available. The general approach is to relate the spectrum of surface motion, typically measured with accelerometers, to mode shapes. This analysis has been applied to motion estimated with a stereo apparatus, which has been used to recover mode shapes for shell-like structures.

Recent work in graphics and vision has used narrow-band phase-based motion magnification to visualize the modal vibrations of objects in video. An alternative visualization has been proposed based on the temporal spectra of weighted optical flow. However, both approaches focus on providing a visualization tool, and neither has been used to recover a basis for simulation.

As described herein, existing visualization techniques can be modified to recover mode shapes that are suitable for simulation.

Motion Synthesis in Video: Several works in computer graphics and vision have focused on synthesizing plausible animations of quasi-periodic phenomena based on a video exemplar. In most of these applications, video synthesis is formulated as a stochastic process with parameters that can be fit to the exemplar. Such approaches work especially well for animating phenomena like rippling water or smoke. With skeletal information provided by a user, these approaches have been extended to model the motion of structures caused by stochastic forces such as wind.

While some example applications described herein can address similar simulations loosely, embodiments described herein differ in that image-space simulations are built based on a modal bases extracted directly from video.

Motion Magnification: Similar to recent publications in motion magnification, embodiments disclosed here can be used to magnify and visualize small vibrations of an object.

However, disclosed embodiments can differ from motion magnification in several key ways. First, while motion magnification is a time varying representation of motion, disclosed methods extract a static representation of each vibration mode and can, therefore, average over the entire input video to reduce noise at each mode. Second, while phase-based methods for Eulerian motion magnification rely on expensive pyramid decompositions of video at render time, disclosed embodiments can use Lagrangian synthesis and can be implemented efficiently on a graphical processing unit (GPU) (processor), allowing for real-time synthesis of motion composed of many vibration modes. Further, while motion magnification can only magnify motion already present in a captured video, disclosed embodiments can be used to flexibly synthesize responses to new combinations of forces, including forces that were never observed in the input video.

Overview of Embodiment Apparatus and Methods

FIG. 1 is a schematic diagram illustrating a device 100 configured to model deformations of a real-world target object. The device 100 includes a memory 102 configured to store a sequence of images 108 of the real-world target object. The device 100 also includes a processor 104 configured to determine an image-space modal deformation basis set representative of real-world motions of the real-world target object from a sequence of images of the object. The processor 104 is also configured to create synthesized, image-space deformations of the real-world target object, based on the modal deformation basis set, in response to a virtual input force hypothetically applied to the target object.

In the embodiment illustrated in FIG. 1, the memory 102 and processor 104 form part of a computer 106, which can include other functions, such as receiving computer inputs 126 from computer peripheral devices such as a mouse or keyboard, for example.

The computer 106 receives the sequence of images 108 into the memory 102 from a camera 110. The camera 110 is configured to view, and capture the sequence of images of, a real-world target object that is a tree 112. The camera 110 can be oriented with an optical axis along the z-direction shown, for example, such that a 2D projection (in or parallel to the XY plane) may be obtained, of the 3D real-world target tree 112, at an image plane of the camera. The tree 112 reacts to a real-world force, in this case, wind 116. The wind 116 causes real-world motions 114 in various locations and having various magnitudes, depending on the specific structure and composition of the tree 112 and the wind forces 116.

Based on the sequence of images of the tree 112, the processor 104 determines an image-space modal deformation basis set that represents the real-world motions 114. The processor 104 also creates synthesized, image-space deformations of the target tree 112 in response to a virtual input force 122 hypothetically applied to the target tree. In the case illustrated in FIG. 1, a virtual input force 122 is defined by a computer user 124. Computer inputs 126 carry the specified virtual input force 122 to the computer 106 for use by the processor 104. The computer 106 outputs data 130, which, in the case illustrated in FIG. 1, includes an image for display at the computer monitor 118.

Shown on the monitor 118 is a synthesized image 112' of the tree 112 undergoing synthesized, image-space deformations 120 in response to the virtual input force 122. The virtual input force 122 is also shown graphically on the monitor, and the user can, in fact, specify the virtual input force 122 using, for example, a computer mouse. However, in other embodiments, the virtual input force can be defined by the user by other means, including other types of input or stored data. Furthermore, in some embodiments, the virtual input force 122 can be automatically defined by a computer, either randomly or based on artificial intelligence, for example.

As further described hereinafter in connection with FIG. 3, the processing functions performed by the processor 104 can be distributed among two or more processors in different locations, either in the same device or in a network environment.

Figure 2:
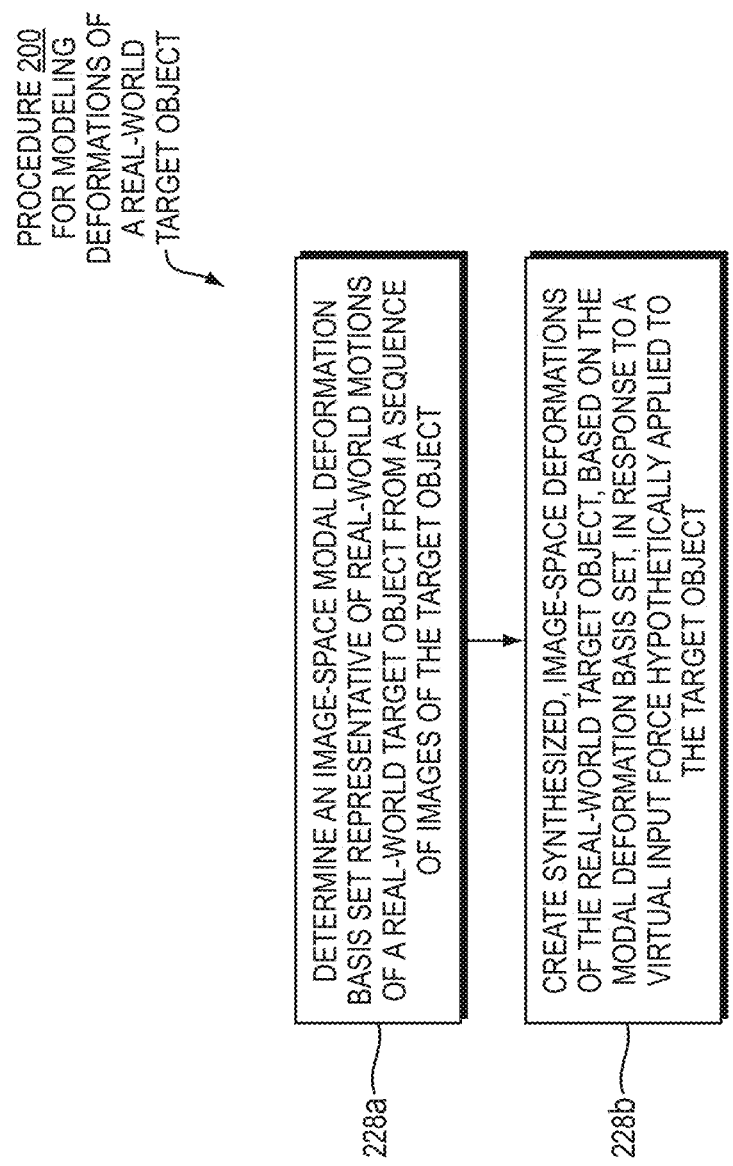
FIG. 2 is a flow diagram illustrating an embodiment procedure for modeling deformations of a real-world target object.

FIG. 2 is a flow diagram illustrating a procedure 200 for modeling deformations of a real-world target object. Such a procedure can be carried out by a single processor, such as the processor 104 in FIG. 1, or distributed among several processors, as described further hereinafter. At 228a, an image space modal deformation basis set representative of real-world motions of a real-world target object is determined from a sequence of images of the target object. At 228b, synthesized, image space deformations of real-world target object are created based on the modal deformation basis set, in response to a virtual input force hypothetically applied to the target object. Various specific embodiments and variations of the procedure 200 are further described herein.

Figure 3:
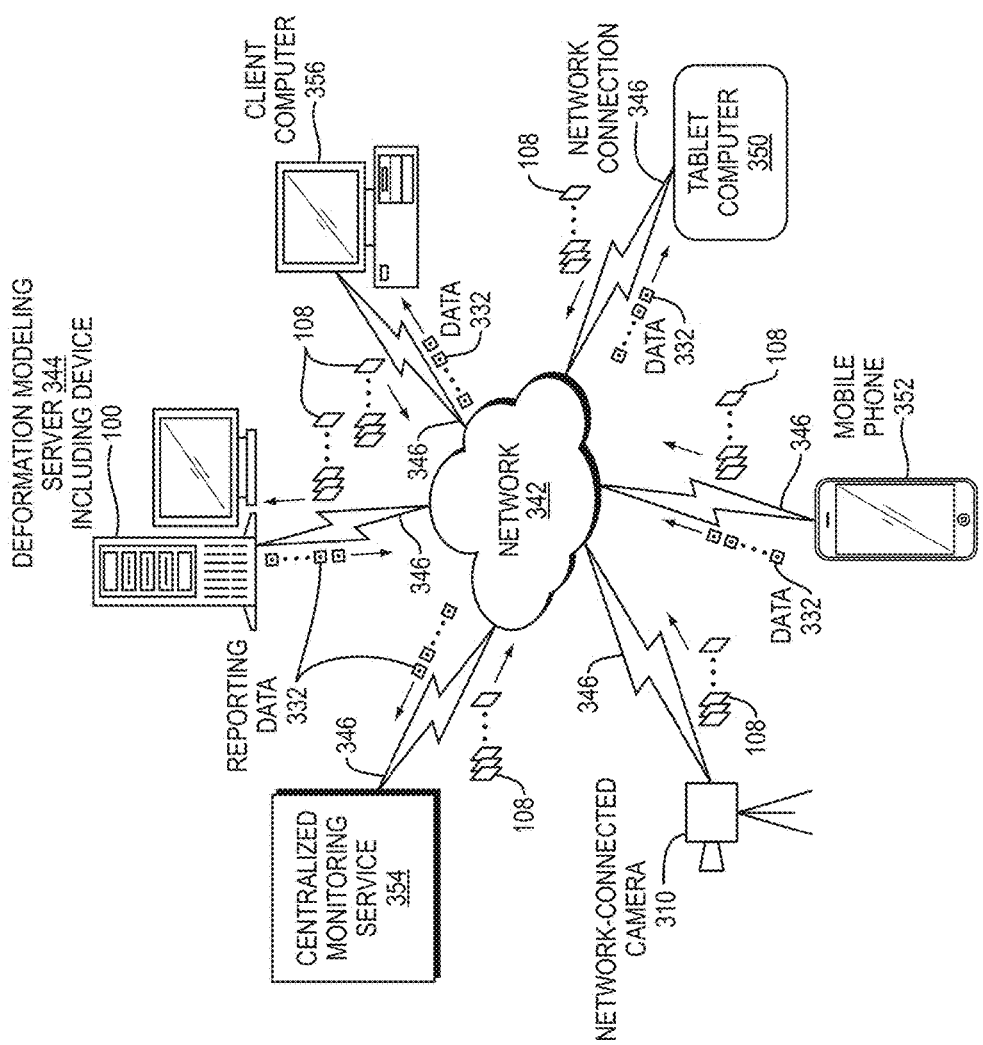
FIG. 3 is a schematic diagram illustrating a network environment in which various embodiments of the invention can operate.

FIG. 3 is a schematic diagram of a network environment 342 in which various embodiments of the invention can operate. A deformation modeling server 344 can include the device 100 illustrated in FIG. 1. Thus, the server 344 can determine an image-space modal deformation basis set, or create synthesized deformations, or both using the procedures illustrated in FIGS. 1 and 2, for example. The server 344 can be in communication with various devices and locations via the network 342, which includes network connections 346. The network connections 346 can include, for example, Wi-Fi signals, Ethernet connections, radio or cell phone signals, serial connections, or any other wired or wireless form of communication between devices or between a device and the network connections 346 that support the communications.

The server 344 can receive sequences of images 108 from various network-connected devices, including a client computer 356, a tablet computer 350, a mobile phone 352, and a network-connected camera 310. Devices such as the mobile phone 352 can include a camera configured to acquire the sequences of images of the real-world target object being monitored for real-world motions. However, in other embodiments, devices such as the client computer 356 can receive sequences of images 108 from other sources, such as the video camera 110 illustrated in FIG. 1 or any other source of images showing a real-world target object to be modeled. Sequences of images 108 are sent through the network 342 to the deformation modeling server 344.

The server 344 responds back through the network 342 to the devices 350, 352, and 356. The reporting (response) data 332 can include the data 130 representing synthesized motions, as illustrated in FIG. 1, for example. Furthermore, the server 344 can also be configured, optionally, to provide images such as the images 112' and virtual input force 122 for visual display, as illustrated in FIG. 1, for example. Furthermore, the reporting data 332 can include other information related to modeling the target object, such as extracted mode shapes (e.g., image-space modal deformation basis set), as described hereinafter in connection with FIGS. 4B and 5B, or a frequency spectrum such as those described hereinafter in connection with FIGS. 5C and 7A-7D, for example. Thus, the network-connected devices illustrated in FIG. 3 not only can receive data representing sequences of images but can also report various types of information related to synthesized deformations.

Also connected to the network 342 is a centralized subscription service 354. The centralized subscription service 354 can monitor or store the various types of information, images 108, and data 332 transmitted around the network 342 from various devices and locations, for example. The service 354 can also provide subscription signup services, for example, enabling users at various network locations to make payment for target object modeling service, for example. In one embodiment, a subscriber includes an engineering services or architectural firm seeking structural or vibrational analysis services of products or buildings, for example. As will be understood, the deformation modeling server 344 can be located at the centralized subscription service 354. Furthermore, other centralized subscription servers and devices may be located at other network locations.

Thus, determining the image-space modal deformation basis set can occur at a network server such as server 344 and operate on the sequence of images 108 of the target object received via one of the network paths 346. Furthermore, embodiment procedures can include uploading the sequence of images to the server 344 from one of the networked devices or downloading the deformation basis set or image-space deformations (e.g., in synthesized image data) from the server 344 to one or more of the networked devices.

As used herein, a "processor" can include one or more processors of any type, either in the same device or separated across a network. Thus, embodiments encompass situations in which the mobile phone 352 only provides a sequence of images 108 to the server 344 and then displays a synthesized video sequence of images received from the server 344, with the server providing all processing for modeling. However, in other cases, all processing functions can be performed by a mobile software application using a processor of the mobile phone 352, for example. In yet other cases, functions are split between locations. For example, the server 344 can receive images, determine an image-space deformation basis set, and provide the basis set to the mobile phone 352, for example. The a mobile software application on the phone 352 can then display a rest-state image of the target object and create synthesized deformations in response virtual input forces defined in real time by a user of the mobile phone 352. Other split-processing arrangements, including some provided by a subscription service, can also be provided.

Modal Analysis

Hereafter is described a connection of the image-space deformations of an object to established modal analysis. First, some relevant theory from linear modal analysis is described. Then, this theory is connected to the observed deformations of an object in video, and a theoretical basis for disclosed methods is provided.

Object Motion

The dynamics of most solid objects under small deformations are well approximated by a finite element model representing a system of masses, dampers, and springs. It can be assumed that objects undergo small deformations around a fixed rest state. Matrices M, C, and K represent mass, damping, and stiffness relationships, respectively, between an object's degrees of freedom, and the equation of motion in response to a force f(t) is given by:

$$M\ddot{u}(t)+C\dot{u}(t)+Ku(t)=f(t), \quad (1)$$

where ü (t), u̇ (t), and u(t) are vectors for acceleration, velocity, and displacement, respectively. Assuming sinusoidal solutions to Equation 1, the eigenmodes of this system are the orthogonal solutions to the generalized eigenvalue problem given by $K\phi_i=\omega_i^2 M\phi_i$. The set of eigenvectors or eigenmodes $\varphi_1 \ldots \varphi_N$ define a modal matrix $\Phi$ shown in Equation 2 which diagonalizes the mass and stiffness matrices into modal masses $m_i$ and modal stiffnesses $k_i$.

$$\Phi=[\varphi_1 \varphi_2 \ldots \varphi_N] \quad (2)$$

$$\Phi^T M \Phi = \text{diag}(m_i) \quad (3)$$

$$\Phi^T K \Phi = \text{diag}(k_i) \quad (4)$$

The matrix $\Phi$ defines modal coordinates q(t) where $u(t)=\Phi_q(t)$. In these modal coordinates, the equations of motion are decoupled into single-degree-of-freedom systems defined by modal masses $m_i$, damping $c_i$, stiffnesses $k_i$, and forces $f_i(t)=\phi_i^T f(t)$. Under a common assumption of Rayleigh damping, modal damping can be expressed by $c_i=\alpha m_i+\beta k_i$ giving the decoupled equation of motion for each mode $$\ddot{q}(t) + 2\xi_i\omega_i\dot{q}(t) + \omega_i^2 q = \frac{f_i}{m_i}, \quad (5)$$

where the undamped natural frequency is $$\omega_i = \sqrt{\frac{k_i}{m_i}},$$

giving the modal damping factor $$\xi_i = \frac{c_i}{2m_i\omega_i} = \frac{1}{2}\left(\frac{\alpha}{\omega_i} + \beta\omega_i\right), \quad (6)$$

The unit impulse response for the $i^{th}$ mode can then be obtained by solving Equation 5:

$$h_i(t) = \left(\frac{e^{-\xi_i\omega_i t}}{m_i\omega_{di}}\right)\sin(\omega_{di}t), \quad (7)$$

where the damped natural frequency is $\omega_{di} = \omega_i\sqrt{1-\xi_i^2}$. Given Equation 7, the response of an object to an arbitrary impulse can be constructed as a superposition of that object's 1D modal responses.

Taking the Fourier transform of the unit impulse response hi(t), the product in Equation 7 becomes the convolution:

$$H_i(\omega) = \left(\frac{1}{m_i\omega_{di}} \frac{\xi_i\omega_i}{\xi_i^2\omega_i^2 + \omega^2}\right) * \left(\frac{\delta(\omega - \omega_{di}) - \delta(\omega + \omega_{di})}{i}\right), \quad (8)$$

which convolves the Fourier transform of the decaying exponential, a Lorentzian distribution; and a pair of delta functions. In other words, the transfer function of a single mode is the convolution of a spike at its resonant frequency and a Lorentzian with a width that depends on modal frequency and damping.

Eigenmodes in Image Space

Hereafter, deformations observed in video are related to projections of the mode shapes $\varphi_i$, and it is shown that these projections can be used as a basis for representing image-space dynamics. First, the dynamics of a single degree of freedom are considered, which are later related to the motion of a visible point in video.

An excitation force f given in modal coordinates can be decomposed into a set of impulses $f_i = A_i\delta(t)$, where $A_i$ is the amplitude of the impulse at mode $\omega_i$. Applying Equation 7, the response of the object at one degrees of freedom $u_p(t)$ is given by $$u_p(t) = \sum_{i=1}^{N} A_i h_i(t)\phi_i(p), \quad (9)$$

where $\omega_i(p)$ is the mode shape coefficient of the degree of freedom p of the object for mode i. Using Equations 8 and 9, the Fourier transform of Equation 9 can be constructed as:

$$U_p(\omega) = \sum_{i=1}^{N} A_i H_i(\omega)\phi_i(p). \quad (10)$$

Here, an assumption can be made that is necessary in FEM-based applications of modal analysis for simulation: that modes are well spaced, or non-overlapping in the frequency domain. Under this assumption, the frequency response of a single degree of freedom at $\omega_{di}$ can be represented as:

$$Up(\omega_{di}) = A_i H_i(\omega_{di})\varphi i(p). \quad (11)$$

A further assumption of weak perspective can be made. This is a common approximation in computer vision, but one that is also not typical when modes are derived from known models. Using this approximation, a target object's coordinate system can be aligned with the image plane of an input video, providing observable degrees of freedom for each pixel's motion in the x and y dimensions of an image. For the purpose of derivation, visibility across all degrees of freedom is represented with the unknown, binary, diagonal matrix V, which multiplies the visible degrees of freedom in a mode by 1 and all other degrees of freedom by 0. The projection of a mode shape $\omega_i$ into the image plane is then $V\varphi_i$.

By taking Fourier transforms of all local motions Vu observed in video, VU, the Fourier spectra for visible degrees of freedom, can be obtained, which, evaluated at resonant frequencies $\omega_{di}$, is $$VU(\omega_{di}) = A_i H_i(\omega_{di}) V\varphi_i. \quad (12)$$

Here, $A_i$ and $H_i(\omega_{di})$ are constant across all degrees of freedom p, meaning that $VU(\omega_{di}) \propto V\varphi_i$. Therefore, the set of complex $\phi'_i$, the values of $VU(\omega_{di})$ measured in video, can be treated as a basis for the motion of the object in the image plane.

Further Assumptions and Considerations

While linear motion is a standard assumption of linear modal analysis that usually applies to the type of small motion analyzed herein, the present derivation makes a few approximations that are not typical of modal analysis applied to simulation.

Weak Perspective.

Here, it is assumed that linear motion in 3D for a target object projects to linear motion in the 2D image plane. This can be violated by large motion in the z-plane Well-Spaced Modes.

Here, separation in the frequency domain is relied upon to decouple independent modes. For example, four frequencies 740a-d selected in FIGS. 7A-7D are separated in the frequency domain shown. This can fail in objects with strong symmetries, high damping, or independent moving parts.

Broad-Spectrum Forcing.

By using observed modes as a basis for the motion of an object in the image plane, an implicit assumption is made about the ratio of modal masses to observed modal forces. Allowing for an ambiguity of global scale, this assumption is still violated when observed forces are much stronger at some modes than others.

Because small motions around a rest state are dealt with here, weak perspective is generally a safe approximation. However, there are some cases where the remaining two assumptions could fail. Fortunately, the consequences of these failures tend to affect the accuracy more than the plausibility of simulation. Consider the failure cases of each approximation. Overlapping modes will cause independent objects to appear coupled in simulation. In other words, the response of an object to one force will incorrectly be an otherwise appropriate response to multiple forces. Similarly, when broad-spectrum forcing is violated, the response of an object to one force will be the appropriate response to a differently scaled, but equally valid set of forces. In both cases, the failure results in inaccurate, but still plausible, deformations of the object.

Details of Embodiment Methods

Methods disclosed herein can first extract a volume of candidate vibration modes from an input video. Then, a user interface can be provided and used for selecting a subset of these candidate modes to use as a basis for simulation.

Extracting Candidate Modes

Optical flow in the x and y dimensions of an input video can be measured using phase variations of a complex steerable pyramid. This approach has been shown to work well for small motion, though Lagrangian flow techniques may be equally well suited to disclosed methods. To filter local displacements, weighted Gaussian filtering can be employed. Local displacements are first given weights proportional to local contrast. The weighted displacements and the weights can both be blurred spatially, and then the filtered displacements can be normalized by their filtered weights. This de-noises displacement signals by causing regions with low image contrast, and therefore noisy displacements, to take on the values of nearby regions with high image contrast.

Next, the temporal FFT of our filtered displacement signals can be computed. Each spatial slice of the resulting temporal frequency spectra forms a candidate shape for a possible mode at that frequency.

Mode Selection

Figures 4A, 4B, 4C, 4D:
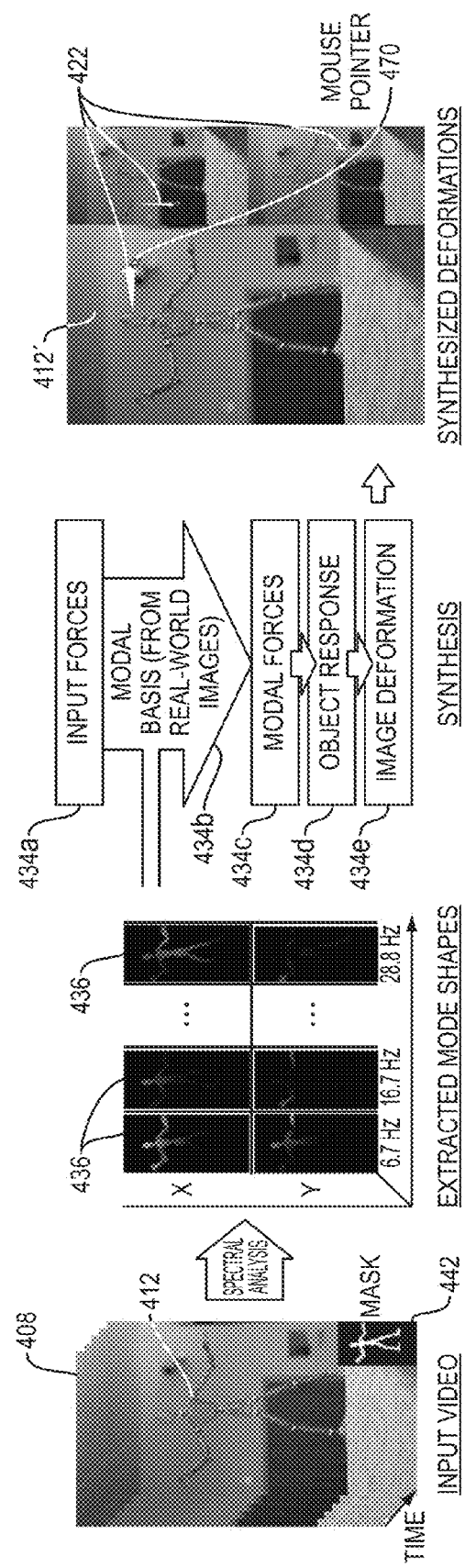
FIGS. 4A-4D illustrate an example process flow for modeling deformations of a real-world target object wireman.

Under ideal conditions, the observed candidate modes $\phi'_\omega$ at each frequency $\omega$ would be zero everywhere except at real mode shapes. However, real video contains unintended motion from a variety of sources (e.g., camera shake, noise, moving background). To distinguish between object deformations and unintended motion from other sources, a user can first be requested to provide a rough mask of the content of interest (the target object). An example mask is shown in FIG. 4A.

A user can then be presented with a graphical interface to help select mode shapes. An example mode selection interface, further described in connection with FIGS. 5A-5C, can display a representative image from the input video, a power spectrum showing the magnitude of motion observed at each frequency, and a visualization of the current selected candidate mode, chosen by the user. The power spectrum shows the average amplitude of unmasked coefficients in each candidate mode shape. It has been shown that resonant modes of an object can be identified as peaks in a similar power spectrum, though the spectra used are based on motion signals.

When a user clicks on the spectrum in the mode selection interface further described hereinafter, the frequency with maximum energy in a small window around the user's mouse cursor is found, and the corresponding candidate mode can be displayed in a mode shape window. The visualization of candidate mode shapes can include phases mapped to hue, and magnitudes mapped to intensity, as illustrated in FIGS. 4B and 5B, for example. Users can select either a set of modes by clicking on different peaks in the power spectrum. This selection process is similar to peak-picking methods that have been used for modal identification of structures in engineering. Informed users are generally able to select a suitable set of mode shapes in less than a minute, though some training to know how to identify "good" mode shapes can be necessary. As an alternative to manual mode selection, automated selection can also be performed based on peak heights, for example.

Complex Mode Shapes

Note that the set of mode shape solutions $\varphi i$ to Equation 1 are real-valued, i.e., they only have binary phase relationships. Similarly, the mode shapes derived using FEM in typical simulation applications are also real-valued. In contrast, the mode shapes recovered in the examples described herein may have non-binary phases. This can happen for a number of reasons, including noise or a violation of one of our assumptions. Mode shapes could be forced to be real-valued by projecting them onto their dominant axis in the complex plane. However, allowing non-binary phases has been found, in testing embodiment methods, to actually improve results. Visually, such mode shapes allow for features like traveling waves and partial coupling that might otherwise require much higher-order modes to represent. By allowing these shapes, the representation is effectively allowed to fit the motion in a video more closely. In this sense, the disclosed technique is allowed to behave somewhat more like methods for exemplar-based motion texture synthesis in situations where motion cannot be explained well with sparse, low-frequency modes.

To ensure that the behavior of simulations reduces to one using only real mode shapes when observed modes contain only binary phase relationships, the dominant orientation can be calculated of each selected mode shapes on the complex plane, and all phases can be rotated so that this orientation aligns with the real axis.

Simulation

Simulation can work on the state of an object in modal coordinates. The key components are a way to evolve the state of an object over time, and a way to translate user input into forces, displacements, and velocities.

Given Equation 5, a state space model per modal coordinate can be defined to simulate the object over time. The state vector $y_i$ that describes the system for a single modal coordinate $y_i = [\underline{o}_i \ \underline{\dot{o}}_i]^T$ can be defined, where $\underline{o}_i$ and $\underline{\dot{o}}_i$ are the modal displacement and velocity vectors, respectively, which relate to the complex modal coordinate by $q_i = \underline{o}_i - i \underline{\dot{o}}_i / \omega_i$. The state can be evolved to $y[n+1]$ given $y[n]$ and a modal force $f_i$ using Equation 1:

$$y[n+1] = \begin{bmatrix} 1 & h \\ -\omega_i^2 h & 1 - 2\xi_i\omega_i h \end{bmatrix} y[n] + \begin{bmatrix} 0 \\ h/m_i \end{bmatrix} f_i[n], \quad (13)$$

with the parameter h, the amount of time passed in the simulation, set to be small enough to ensure that this equation is stable.

Optional User Input

Users can be provided with modes of interaction that can be divided into two categories: forcing interactions and direct manipulations. Forcing interactions affect state indirectly by changing the force $f_i$ applied to a target object. Direct manipulations translate user input directly into instantaneous state y.

Forcing Interactions: Forcing interactions translate user input into a force to be applied at a specified point. In the simplest forcing interaction, a user clicks at a point p on the object and drags a computer mouse in a direction d. This can be interpreted, for example, as specifying a force f to be applied at the point p in the direction d. The scalar modal force $f_i$ applied to each mode can be computed by taking the magnitude of the dot product of d with the value of that mode shape $\phi'_i$ at point p:

$$f_i = \|d^T \phi'_i(p)\| \alpha, \tag{14}$$

where α is used to control the strength of the force and can be set by the user with a slider. Note that the magnitude can be taken here because the mode shape $\phi'_i$ is complex.

Direct Manipulation: Real objects are often found in configurations that are difficult or impossible to achieve through forces applied to one point at a time. However, fully specifying shaped forces is a difficult user interaction problem. Instead, a mode of interaction can be provided that allows users manipulate the position or velocity of a single point (point position or point velocity, respectively) on the target object directly, for example. This lets users explore states with greater contributions from higher-order modes that are difficult to achieve without shaped forces. This can be accomplished by explicitly setting the state of the object whenever the user's mouse is pressed, and only letting the state evolve once the mouse is released. As with forcing interactions, the user specifies a point p and direction d with a mouse. The magnitude of each modal coordinate can then be computed in the same way as computed the magnitude of modal forces before:

$$\|q_i\| = \|d^T \phi'_i(p)\| \alpha, \tag{15}$$

where α is used to control the strength of the manipulation and can be set by the user with a slider. However, in this case, the phase of the modal coordinate is set to maximize either the displacement or velocity of p in the direction d. This can be accomplished by setting the phase $\text{Arg}(q_1)$ to:

$$\text{Max Displacement } \text{Arg}(q_i) = -\text{Arg}(d^T \phi'_i(p)) \tag{16}$$

$$\text{Max Velocity: } \text{Arg}(q_i) = -\text{Arg}(d^T \phi'_i(p)) + \frac{\pi}{2} \tag{17}$$

For objects with real mode shapes, velocity is maximized when displacements are zero, and displacement is maximized when velocities are zero. Intuitively, maximizing displacement lets users "pull" a point around the screen and see how the object deforms in response, while maximizing velocity specifies an impulse to be applied when the mouse is released.

Rendering Deformations

The target object can be rendered in a given state by warping a single color image, representing the object's rest state, by a displacement field D(t). D(t) can be calculated as a superposition of mode shapes weighted by their respective modal coordinates:

$$D(t) = \sum_i^N \text{Re}\{\phi'_i q_i(t)\} \tag{18}$$

This can be evaluated efficiently on the GPU by representing each $\phi'_i$ as a red green blue alpha (RGBA) texture storing two complex numbers per pixel, corresponding to the coupled image-space x and y displacements of $\phi'_i$. Each $\phi'_i q_i(t)$ term is computed in a single rendering pass, accumulating $D_t$ in a frame buffer that can be applied as a displacement map to the color image in a final pass. The implementation described here uses depth culling and assigns pixels depth values that are inversely proportional to the magnitude of their displacement, causing parts of the image that move more to occlude parts that move less. This tends to work better than blending pixel values in practice, as objects closer to the camera usually exhibit larger screen space motion due to foreshortening.

Note that rendering deformations according to this method is substantially faster than renditions in existing work on motion magnification, and the rendering described here can run in real time. This is because, unlike previous work on motion magnification, the complex steerable pyramid need not be relied upon at render time according to example embodiments.

Implementation Details

The mode extraction and selection interface described here were written in MATLAB. Once modes were selected, they were exported as 8-bit RGBA TIFF images and loaded into a simulation software, which was written in C++ and used Qt, OpenGL, and GLSL.

The slowest part of the method as implemented to test embodiments described herein is building a complex steerable pyramid on the input video. Using one MATLAB implementation, this required less than two minutes on shorter videos like the Wireman described hereinafter, but can take 2-3 hours or longer for high-speed videos like the Ukulele example described hereinafter. The only parameter set for this implementation was the standard deviation of the Gaussian used for filtering local motion signals. Local motion signals representative of real-world motions of the target object can be determined from optical flow techniques, for example, as part of determining the image-space modal deformation basis set from an input image sequence. A complex steerable pyramid can be used to obtain these motion signals. The strategy used for setting this parameter was to effectively test out four values at once and to choose a standard deviation that was 5-10% of the larger image dimension, filter with this standard deviation at all scales, and use the highest-resolution scale that does not appear noisy. Mode selection can then usually be done in less than a minute, but users may choose to spend more time exploring the recovered spectra with the selection interface described herein.

Further Summary Description of Embodiment Methods

FIGS. 4A-4D illustrate an example embodiment procedural flow for modeling deformations of a target object using the calculations and modal selection interface described hereinabove. In this case, the real-world target object is a wireman 412. It should be understood that, as used herein, a "real-world target object" can include any real object, plant, animal, person, feature, or other entity that exists in the real world, outside of image space, for which images can be captured. The wireman 412 is captured in a sequence of images 408 over time in an input video, as illustrated in FIG. 4A, as the wireman moves. The images 408 are 2D representations of the 3D wireman. In other embodiments, synthesized 3D deformations can be created by extending the methods described herein to 3D by use of a 3D camera, for example, and modifying the analysis accordingly.

The wireman is induced to move by an impulse force, a person's first banging on a mount holding the wireman, as further illustrated in FIG. 6A. A spectral analysis is performed on the sequence of images 408, as described in more detail in connection with FIGS. 5A-5C. Based on the spectral analysis, various mode shapes 436 are extracted for various frequencies of motion observed in the image sequence 408. The mode shapes 436 are 2D image-space representations of real motions of the 3D wireman observed in a 2D imaging plane for the images 408 of the input video. While real deformations of the 3D wireman may be orthogonal, 3D deformation modes, the extract mode shapes 436 represent 2D projections of the 3D deformation modes.

In the example shown in FIG. 4B, X and Y components of motion at 6.7 Hertz (Hz), 16.7 Hz, and 28.8 Hz are determined. These extracted mode shapes form a basis set from which motions can be synthesized in response to virtual input forces.

FIG. 4C is a flow diagram illustrating an example procedure for synthesizing image-space deformations of the wireman based on the basis set shown in FIG. 4B. At 434a, input forces are specified. At 434b, the modal basis set is obtained based on the recovered mode shapes 436 extracted, as shown in FIG. 4B. At 434c, modal forces are calculated, based on the input forces and the X and Y components of the modal basis set. At 434d, response of the wireman object is calculated. Then, at 434e, image deformations are created based on the object response.

FIG. 4D illustrates the resulting, synthesized motions of the wireman graphically rendered. In particular, FIG. 4D shows three synthesized images with synthesized representations 412' of the wireman in response to various virtual input forces 422 hypothetically applied at various points of the wireman. The wireman 412 is a convenient example to use to test embodiments of the invention, as it is constructed of various rigid limbs and "body" parts flexibly connected to each other, giving rise to a variety of distinct motion modes at different frequencies.

The synthesized images in FIG. 4D are shown as part of a graphical user interface (GUI) that allows a user, such as the user 124 in FIG. 1, to specify the virtual input forces. Also visible in FIG. 4D is a mouse pointer 470 indicating the position of the end of the force arrow 422 as defined by the user. As further exemplified herein, one or more of pointing, clicking, dragging, and releasing a computer mouse may be used by a user with interface software to define, at a GUI, positions and directions of virtual forces (e.g., point forces, point positions, point velocities, etc.) to be applied to a target object. As will be understood, the output of embodiment methods can include a single, static, synthesized image such as one of the images illustrate in FIG. 4D, or multiple synthesized images representing dynamic, synthesized motion of the target object in response to one or more virtual input forces, as will be further described hereinafter in connection with other figures. One or more of the synthesized images, whether in digital or analog form, can comprise a product prepared according to one or more of the methods disclosed herein.

FIG. 5A includes an image from a video of a cloth 512 hanging from a beam, which was used as an example real-world target object.

FIGS. 5B and 5C illustrate various aspects of the mode selection interface developed to test embodiments of the invention, as further described hereinabove. In particular, FIG. 5C is a graph showing a global power spectrum for the input source video of the cloth 512. The power spectrum 538 shows the magnitude of overall motion in the video observed at each frequency. A global power spectrum such as that shown in FIG. 5C can be obtained, for example, by calculating an average Fast Fourier Transform (FFT) averaged over an entire image plane for a sequence of images. Alternatively, averaging over only a spatial portion of the image plane, such as portion defined by the mask 442 shown in FIG. 4A can be done to exclude motions from extraneous objects in motion in the image sequence. Furthermore, a mask can be used to define different spatial portions where two different target objects of interest are present in an image sequence.

A user, such as the user 124 illustrated in FIG. 1, selects a possible desired basis frequency 540, and FIG. 5B shows a computer screen inset panel showing a visualization of the horizontal and vertical motion modes 536 corresponding to the selected frequency 540. In particular, phases in FIG. 5B interface are mapped to hue, and magnitudes are mapped to intensity, as described hereinabove.

Further Specific Examples of Creating Synthesized, Image-Space Deformations Using Embodiment Methods and Apparatus FIGS. 6A-6C are images of the wireman 412 captured at various times while exciting motion in the wireman. In this case, the excitation source is a first 616 applying an impulse force to the base on which the wireman 412 is mounted. Various motion modes are, thus, excited in the wireman, causing motion that can be captured in the sequence of images 608. FIGS. 6B and 6C illustrate various motions 614 that continue after the impulse is applied.

FIGS. 7A-7D further illustrate mode selection for the motions observed in the wireman illustrated in FIGS. 6A-6C. The mode selection interface includes a power spectrum 738, similar to the power spectrum 538 illustrated for the cloth in FIG. 5C.

Figure 7A:
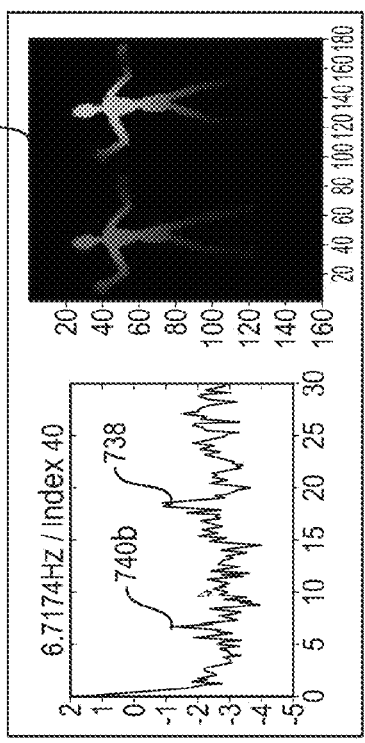
FIGS. 7A-7D are series of images showing respective frequencies selected from a global power spectrum of motion of the wireman shown in FIG. 4A, each with a corresponding graphical representation of mode shapes extracted from video of the wireman at the respective, selected frequency.
Figure 7B:
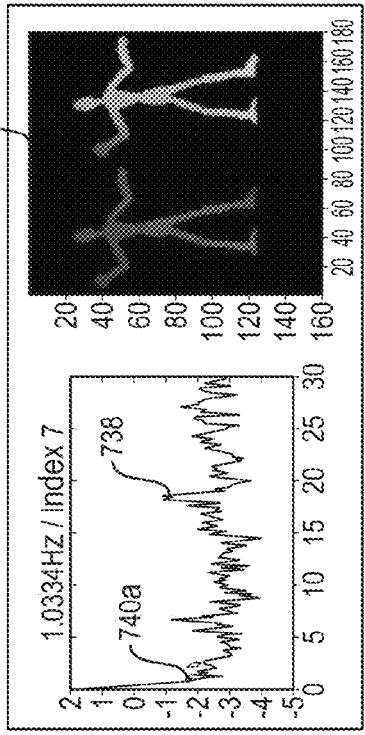
Figure 7C:
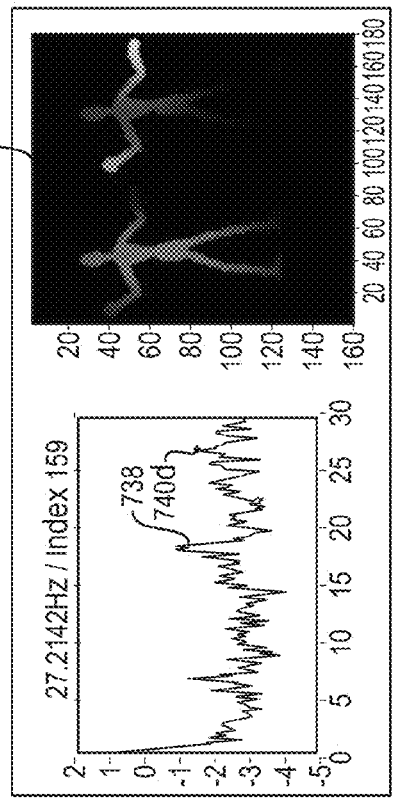
Figure 7D:
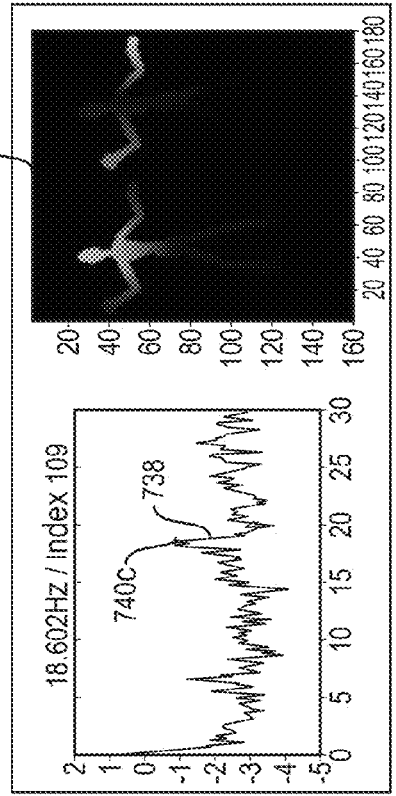

In FIG. 7A, the user selects a frequency 740a, and static representations of vibration motion modes 736a are illustrated for the selected frequency 740a. In FIG. 7B, the user selects a different frequency 740b, and the selection interface illustrates motion modes 736b. Similarly, in FIG. 7C, the user selects a frequency 740c, and motion modes 736c are graphically illustrated for that frequency. Finally, in FIG. 7D, the user selects a motion frequency 740d from the power spectrum 738, and corresponding static representations of motion deformation modes 736d for the frequency 740d are illustrated by the interface.

Figures 8A, 8B:
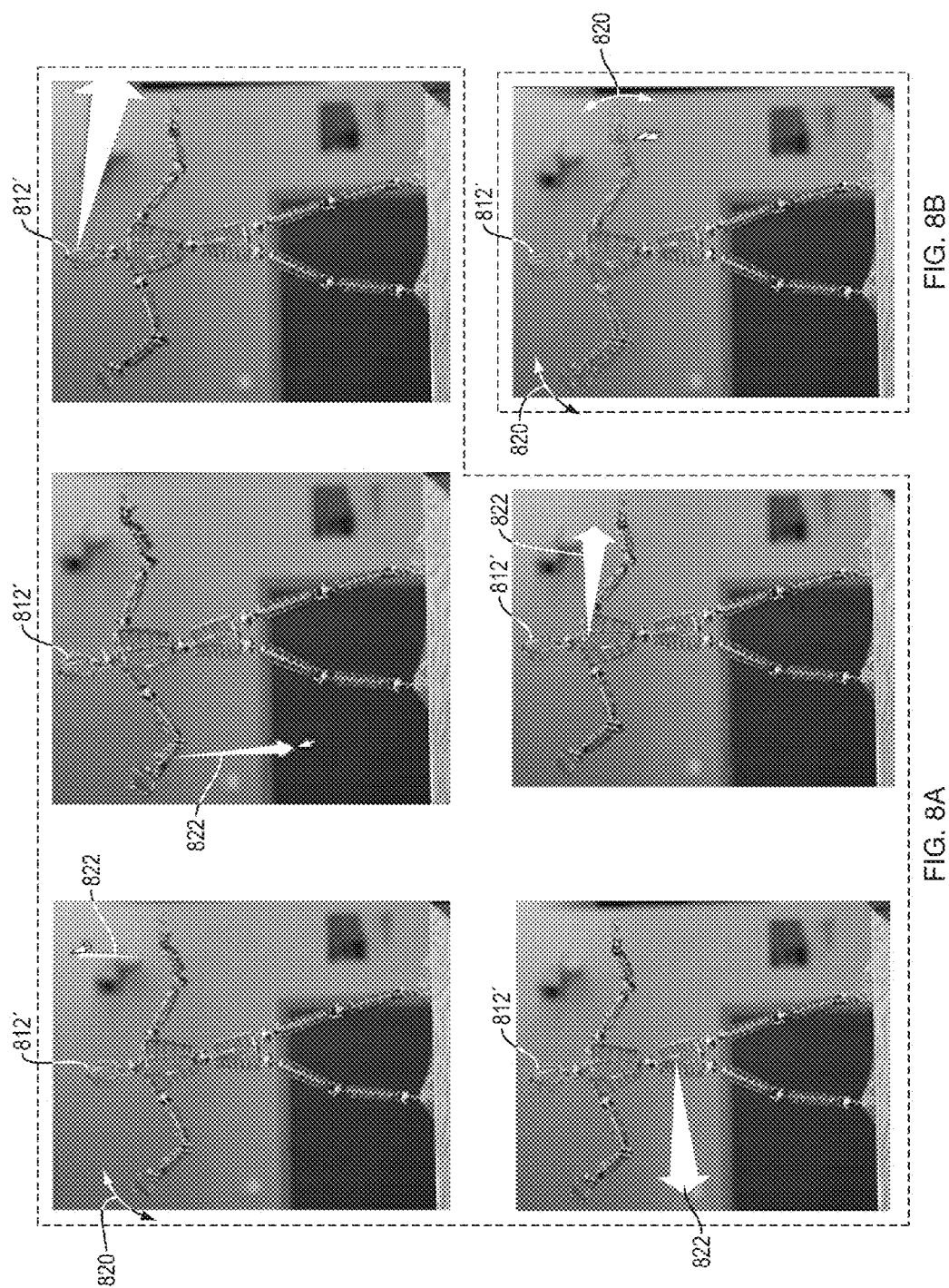
FIG. 8A is a series of five images showing synthesized, image-space deformations of the wireman shown in FIG. 4A in response to respective, virtual input forces applied thereto.
FIG. 8B is an image showing continued, synthesized, image-space deformations of the wireman in FIG. 8A during relaxation subsequent to hypothetically applying one of the virtual input forces shown in FIG. 8A.

FIG. 8A is a series of five images, with synthesized motions 820 of the wireman in response to various user-specified input forces 822 applied to various parts of the wireman for different images. In the case of FIG. 8A, the virtual input forces 822 are applied as direct manipulations, as described hereinabove. Thus, synthesized representations 812' of the wireman result. These synthesized representations are based on the modal deformation basis set developed using the user interface illustrated in FIGS. 7A-7D.

FIG. 8B is similar to FIG. 8A and shows continued, synthesized motions 820 of the wireman resulting from the force 822 having been previously applied. As illustrated in FIG. 8B, motion relaxation over time for a target object is correctly synthesized using the model developed using embodiment methods and devices.

FIG. 9A includes a sequence of images 908 of a playground 912 as the real-world target object. In the sequence 908, various real-world motions 914 are observed in the playground equipment in the sequence of images from the input video used to develop a modal deformation basis set. In this case, the real-world motions 914 are in response to a real-world input force applied as an impulse (not shown) to parts of the playground equipment. Based on the sequence of images 908 obtained from video of the playground, a modal deformation basis set for the playground was developed, as described hereinabove for other modeling cases.

As described hereinabove, embodiment methods can be used to obtain the modal deformation basis set based solely on input video images, such as the images 908 of the playground, without additional structural information about the target object. However, embodiments do not preclude also applying additional information about the real-world target or about real-world forces acting on the target during acquisition of the image sequence. For example, it will be understood that, where a target object such as the playground 912 or a bridge (not shown) has endpoints constrained, it is possible to apply this knowledge in a model of the playground or bridge to calculate motion frequencies for the target object, for example. Furthermore, any known forces acting on the target during image acquisition can optionally be used in modeling, as will be understood.

FIG. 9B is a series of synthesized images 912' showing synthesized motions 920 of the playground equipment in response to various virtual input forces 922 applied at different points of the playground equipment. In the case illustrated in FIG. 9B, the virtual input forces 922 were specified as point forces applied to given, respective points of the playground, as further described hereinabove.

Figure 9C:
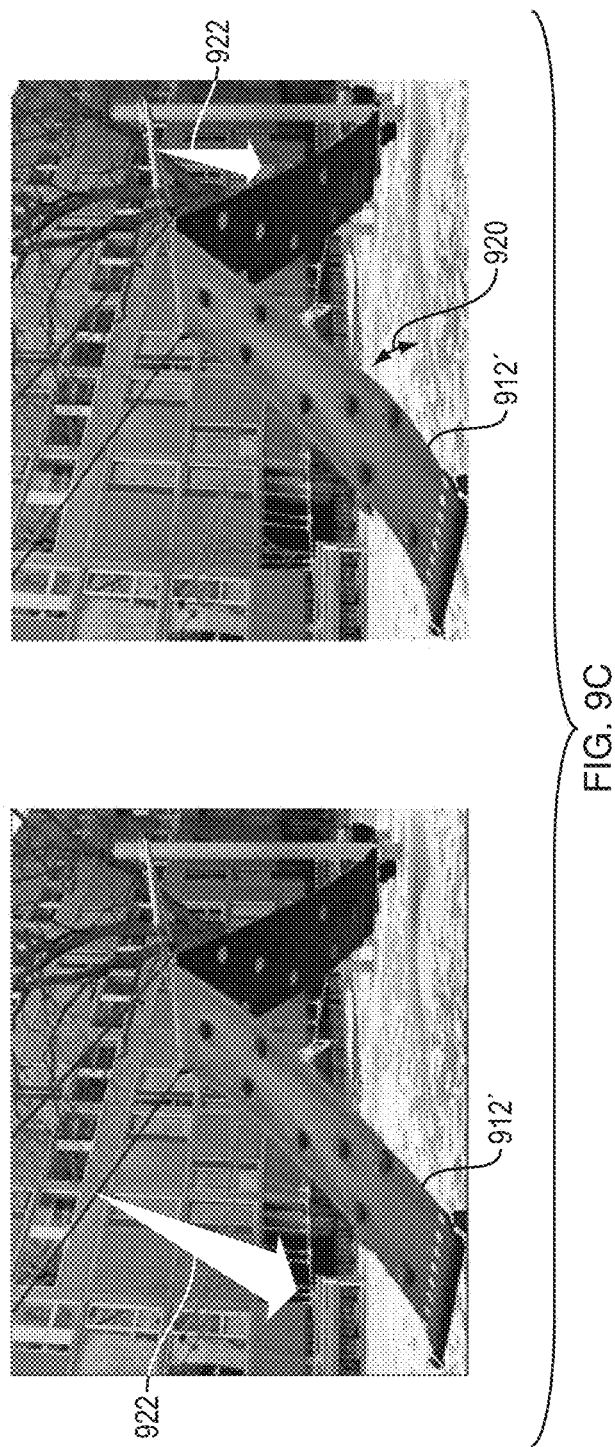

FIG. 9C is similar to FIG. 9B in illustrating synthesized motions of the playground equipment in response to various virtual input forces. In FIG. 9C, the virtual input forces 922 are applied to cables holding the playground equipment, which serves to illustrate that various coupled motions throughout a sequence of images all form part of a motion basis set. Thus, the synthesized motions 920 of the playground equipment remain realistic even where virtual input forces 922 are applied indirectly, to portions of the target object that are only indirectly coupled to each other.

FIG. 9D shows a sequence of synthesized images 912' of the playground equipment showing synthesized motions 920 continuing in response to the virtual input forces 922 shown in FIGS. 9B-9C. Thus, as can be seen, the modeled, synthetic motion continues, realistically, and is gradually damped after virtual input forces are applied based on the model.

Figure 9E:
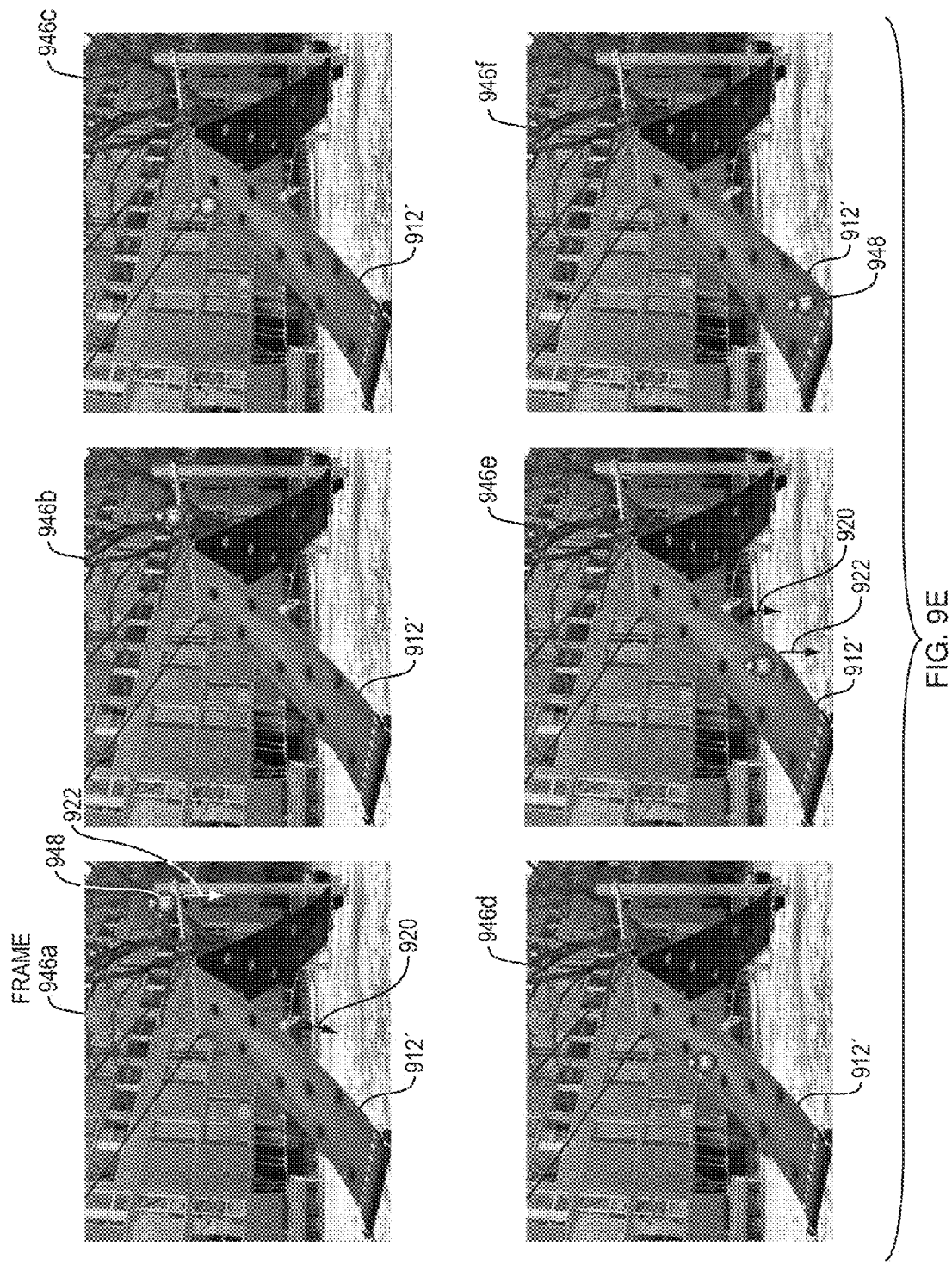
FIG. 9E is a series of images showing synthesized deformations of the playground shown in FIG. 9A in response to virtual input forces hypothetically applied by an animated character disturbing the playground set.

FIG. 9E is an example sequence of synthesized images showing how embodiments of the invention can be used for animation. In particular, synthesized image frames 946a-f show synthesized motions 920 in response to an animated, hypothetical character 948 assumed to hop onto various parts of the playground equipment, thus applying the virtual input forces 922. These virtual input forces 922 are new, specific forces neither applied nor observed acting on the target playground object in the input image sequence in FIG. 9A In particular, in the synthesized frame 946a, the character 948 stands on a cable holding the playground equipment, applying a force 922 to the cable. The playground equipment then reacts with various motions 920 in various portions of the synthesized image, as determined by the model. In synthesized frame 946b, the character 948 continues to hop to a different part of the cable.

At synthesized frame 946c, the character 948 first hops onto the main part of the playground equipment. Again, at each point, the character 948 is assumed to apply an appropriate virtual input force 922 to the playground equipment, causing excitation of different motion modes by different amounts, according to the model. At synthesized frames 946d-f, the character 948 continues to hop down the playground equipment, touching various points on the equipment and exciting various motion modes illustrated by synthesized motions 920.

FIG. 10A is a sequence of images 1008 of the cloth 512 shown in FIG. 5A. To acquire the sequence of images 1008, only ambient air movement and minor wind currents were relied upon to excite motion in the cloth 512. Thus, the real-world motions of the cloth 512 captured in the image sequence 1008 were so small as to be practically invisible to the human eye. However, in accordance with embodiment methods for analyzing video as described herein, the motions can still be used to determine a modal basis set to synthesize motions in response to virtual input forces that are much larger.

FIG. 10B is a series of synthesized images of the cloth 512 produced, based on a basis set and model determined from the sequence of images 1008 in FIG. 10A. In the graphical user interface, the user input forces 1022a, specified as direct manipulation forces, producing the large synthesized motion deformations 1020a, which are representative of a wave traveling across the cloth 512.

FIG. 10C is a synthesized image sequence similar to that in FIG. 10B, except that the synthesized motions are calculated based on specifying virtual input forces 1022b as point forces, as described hereinabove. As in FIG. 10B, large, realistic, synthesized motions 1020b are visible in the cloth 512, despite the extremely small motions in the input video sequence 1008.

FIG. 11A is an input video sequence of images 1108 of a bush 1112 used as the real-world target object. For the image sequence 1108, real-world input forces were minor, including minor ambient air currents. For example, in the image sequence, a reflection of a car passing on an adjacent street can be seen in a window next to the bush 1112, which could serve as one source of minor air currents applied to the bush, in addition to other ambient air currents and other forces. From the sequence 1108, a model including image-space modal deformation bases representing the real-world motions of the bush 1112 was developed.

FIG. 11B is a series of synthesized image frames 1146a-c showing the effects of virtual input forces 1122 applied to the bush. In particular, the virtual input force 1122 was applied as a direct manipulation force, causing synthesized motions 1120 be observed in the synthesized bush images 1112'.

In frame 1146a, the direct manipulation virtual input force 1122 is seen to be applied, with the bush reacting with various displacements, including an overall upward displacement reflecting the force 1122. In synthesized frame 1146b, the bush is seen to react with vigorous, synthesized motions 1120 in response to the virtual input force 1122 being withdrawn. Frame 1146c shows continued motions 1120 of the synthesized bush image 1112 as it further relaxes over time.

Figure 12A:
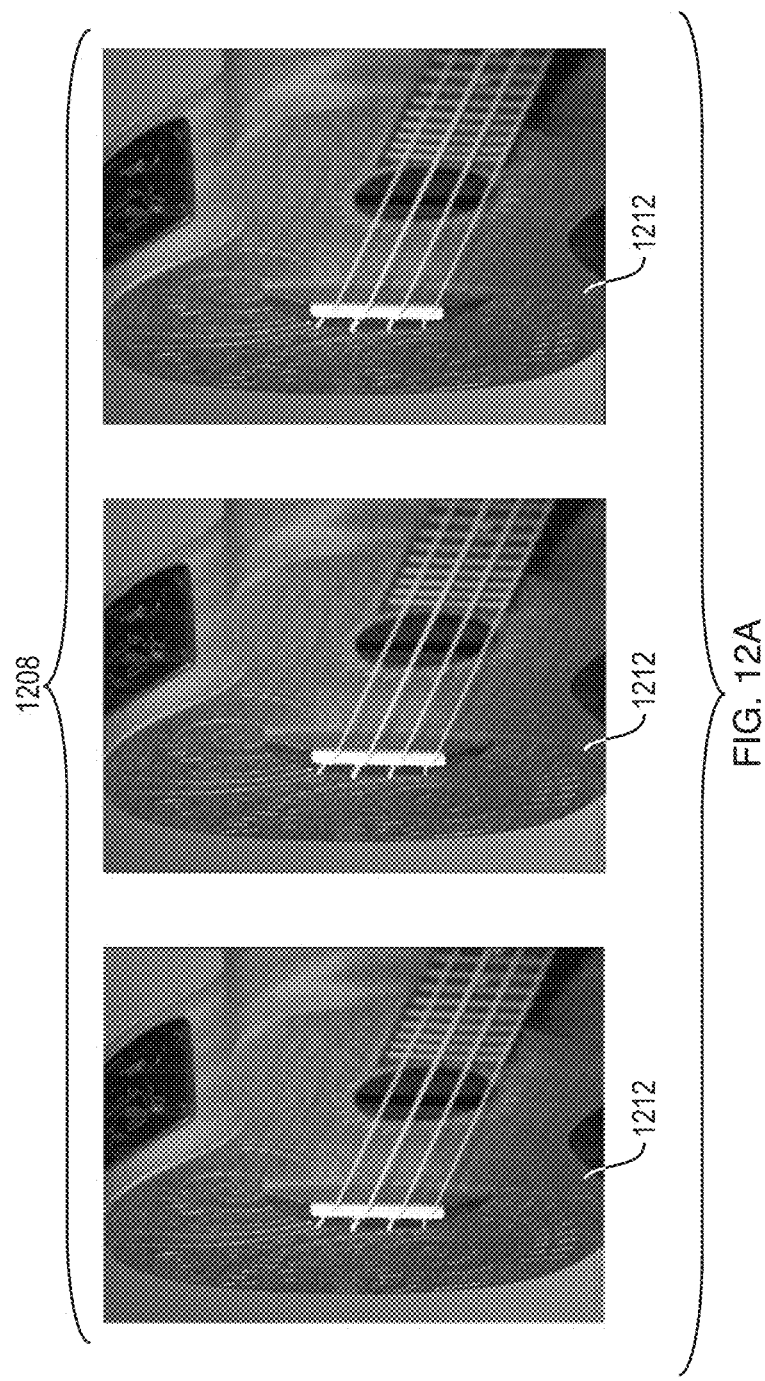
FIG. 12A is a sequence of images of a ukulele obtained from high-speed video showing the ukulele responding to sound from a nearby loudspeaker.

FIG. 12A is a sequence of images 1208 of a ukulele 1212. During acquisition of the sequence of images, motion in the ukulele was excited by sound emitted from a nearby loudspeaker (not shown). The images 1208 acquired with high-speed video (1400 frames per second (fps)), thus enabling capture of the applicable higher frequencies for the ukulele vibration motions.

FIG. 12B is a series of synthesized image frames 1246a-c showing the ukulele 1212 reacting to a virtual pluck of one of a string 1264 of the ukulele, specified as a direct manipulation virtual input force 1222a. The virtual force 1222a resulted in synthesized motions 1220 of the string visible in synthesized images 1212' of the ukulele. Frames 1246b-c show visible excitation of motion modes of the guitar string in response to the virtual pluck input force 1222a. As expected, the simulated, synthesized motion of the strings varied, depending on where the virtual pluck was applied on the string. In particular, for different virtual pluck positions, different string motion modes were clearly visible as a frame rate for the synthesized video images was reduced.

FIG. 12C is a series of synthesized frames similar to those in FIG. 12B, except that a virtual input force 1222*b*, applied as a direct manipulation force, was applied at a body 1262 of the ukulele instead of the strings 1264. Similar to the case of the cloth illustrated in FIGS. 10A-10C, very small motions of the ukulele were successfully captured and used to model motion of the ukulele. While the string motions are less visible in FIG. 12C than in FIG. 12B, string motion still occurred in response to the virtual force 1222*b* applied at the body of the ukulele.

FIGS. 13A-13B illustrate another way in which embodiments of the invention can be used. In particular, a virtual input force can be hypothetically applied to a real-world target object by a real-world source object. In FIGS. 13A-13B, the real-world target object is a tree 1312 in a pot, while the real-world source object is a person 1358 pretending to be able to apply force to the tree 1312 at a distance.

Thus, in the sequence of images 1308, at frame 1346*a*, the person pretends to prepare to apply force to the tree. At frame 1346*b*, the person makes an upward gesture with his arm, pretending to be able to force branches of the tree upward. Finally, at frame 1346, the person again relaxes his arm, pretending to be able to release the tree 1312 from the pretended force pretended to be applied in frame 1346*b*. However, in the raw video image sequence 1308, the only forces (real forces) actually applied to the tree included minor impulse forces not particularly visible to the naked eye in the video image sequence 1308. Based on the sequence 1308, a modal deformation basis set was determined to model motion of the tree 1312.

FIG. 13B is a series of synthesized images 1346*c-e* in which the same motions of the person 1358 are seen. However, in the images 1346*c-e*, virtual input forces 1322 are hypothetically applied, using the modal deformation basis set for the tree 1312, resulting in synthesized images 1312' of the tree showing synthesized motions 1320 in response to the motions of the person 1358.

In particular, at frame 1346*c* of FIG. 13B, the person pretends to apply a force at a distance to the tree. Correspondingly and synchronously, a virtual input force 1322 is upwardly applied to the bush, resulting in significant, synthesized motion of the bush. Thus, frame 1346*d* should be compared with frame 1346*b*, in which no significant motion of the tree is seen in response to the pretended force applied by the person, because no virtual force was hypothetically applied. At frame 1346*e*, the person is again seen to relax his arm, pretending to release force on the bush. Synchronously, the virtual input force hypothetically applied to the tree in frame 1346*d* is released, resulting in the strong relaxation motions 1320 of the bush. At frame 1346*e*, relaxation motions 1320 become smaller as synthesized oscillation of the tree relaxes.

In should be noted that, in the playground and force tree examples described hereinabove, inpainting was used to fill disoccluded parts of synthesized images.

Further Description of Examples and Results

Figures 14A, 14B:
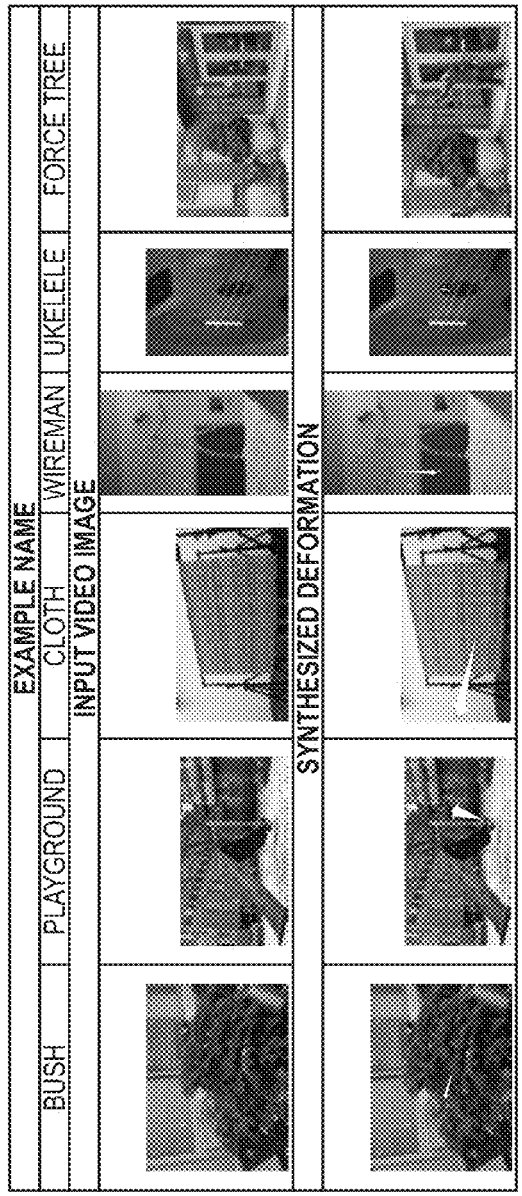
FIG. 14A is a table summarizing various examples of target objects for which input video and synthesized images were obtained, described herein in connection with other FIGS.
FIG. 14B is a table summarizing camera parameters, real-world excitation motion sources, and deformation basis set parameters used for the various example target objects summarized in FIG. 14A.

FIG. 14A is a table showing a summary of examples, their code names, and representative thumbnail images showing the static rest state used for the respective examples described hereinabove. The respective, static, rest-state images were modified based on the virtual input forces to create the synthesized deformations of the target object in image space, as further described hereinabove. The rest-state images were warped by applying the displacement field described hereinabove, with the displacement field calculated as a superposition of basis mode shapes weighted by respective modal coordinates without relying on a complex steerable pyramid (CSP) for synthesis.

FIG. 14B is a table illustrating various video parameters, camera types, video source lengths, frame rates, and real-world execution sources for the input video sequences obtained in the respective examples. FIG. 14B also shows the respective numbers of excitation modes selected for development of the respective models, along with the range of frequencies over which the selected modes occurred.

All of the respective image sequences were obtained from input videos captured and recorded while using a tripod video camera mount. In one example not illustrated in the figures, a video of a bridge was downloaded from an public Internet source, a modal basis set was determined for the target object model bridge based on a sequence of images in the video, and the animated character 948 illustrated in FIG. 9E was simulated to interact with the model bridge successfully in synthesized images. Thus, image sequences of target objects from a wide variety of sources can be used in accordance with embodiment methods and apparatus.

Note that motion blur is not typically a problem for embodiment methods and apparatus for several reasons. First, analysis of real-world motions of target objects can be limited to small motions, so motion blur is not common. Second, synthesized deformations can be created by relying on only one sharp frame of the object in its resting state, together with the basis sets and virtual forces described hereinabove. In practice, motion blur tends to help mode recovery by acting as a pre-filter to prevent temporal aliasing.

Simulations described hereinabove plausibly reproduced behavior observed in most input videos. Disclosed methods can work well even with regular cameras operating at 30 frames per second. Thus, embodiments need not rely on expensive, high-speed, or otherwise high-end cameras. Instead, a sequence of images from a variety of cameras, including standard mobile phones, can be successfully used to develop modal basis sets. While higher-frequency modes exist in many objects, their fast temporal dynamics are not usually visible in input videos. The ukulele example described hereinabove explores the use of a high-speed camera to recover modes that are not visible at normal frame rates.

As described hereinabove, where virtual input forces are defined by a user, an interactive tool can be provided for synthesis. In many examples described hereinabove, for example, arrows show virtual input forces defined by a user using a standard computer mouse. In each interactive session, an arrow is rendered to indicate where users click and drag. The head of the arrow points to the current mouse location, and the tail of the arrow ends at the displaced point p where the user initially clicked.

Interactive animations described hereinabove were quite compelling. In certain cases not illustrated, where the assumption described hereinabove of non-overlapping modes is violated, independent parts of a scene appeared coupled. This effect was very subtle in most results obtained. It is expected that this potential issue can be easily addressed by defining multiple masks such as the mask illustrated in FIG. 4A to indicate independent parts of the scene.

Special Effects: A variety of visual effects can be achieved by specifying forces in different ways. Embodiment methods and apparatus can be used to create low-cost special effects. For example, by using forcing interactions and setting d to be a vector pointing down, the effect of increased weight force on a target object at the point p can be simulated. For example, this has been successfully used to simulate a small robot rolling along the surface of different objects, similar to the animated character 948 interacting with the playground in FIG. 9E. When the robot "lands" on a point p of the target object, the robot can be fixed to p by applying the time-varying displacement at p to the image of the robot at each frame. By moving p along a trajectory specified in the object rest state, the robot can be caused to "roll" along the target object's surface in a way that couples their dynamics, for example.

In the force tree example illustrated in FIGS. 13A-13B, the force d applied to branches of the tree was controlled so that the branches appeared to be controlled by the moving hand of the real source object person 1358, who also appeared in the synthesized images in FIG. 13B. In this way, it appeared as though the leaves of the tree 1312' were coupled (or controlled through some supernatural force) by the hand. This is substantially simpler than modeling a synthetic tree and matching its appearance to a filmed scene, for example.

In summary, it has been shown that, with minimal user input, a modal basis set for image-space deformations of an object can be extracted from video, and this basis set can be used to synthesize animations with physically plausible dynamics. Thus, embodiments described herein can be a valuable tool for video analysis and synthesis. Resulting, example interactive animations thus created can bring a sense of physical responsiveness to regular videos. This can result in low-cost methods for special effects by enabling the direct manipulation of objects in video, for example.

While this invention has been particularly shown and described with references to example embodiments thereof, it will be understood by those skilled in the art that various changes in form and details may be made therein without departing from the scope of the invention encompassed by the appended claims.

What is claimed is:

1. A method of modeling deformations of a real-world target object, the method comprising:
   determining, from a sequence of images of a real-world target object, a modal deformation basis set in image space and representative of real-world motions of the real-world target object, by performing peak selection from a temporal frequency power spectrum of the sequence of images;
   extracting, from the sequence of images, a static representation of one or more vibration modes of the real-world target object;
   creating synthesized, image-space deformations of the real-world target object, based on the modal deformation basis set, in response to a virtual input force applied to the real-world target object, by applying the virtual input force to the basis set in modal coordinates; and
   outputting one or more synthesized images showing the static representation of the one or more vibration modes of the real-world target object with the synthesized, image-space deformations applied thereto.

2. The method of claim 1, wherein determining the modal deformation basis set includes selecting basis frequencies from an average power spectrum of frequencies averaged over at least a spatial portion of the sequence of images.

3. The method of claim 1, wherein determining the modal deformation basis set includes calculating two-dimensional (2D), non-orthogonal projections of orthogonal, three-dimensional (3D) deformation modes.

4. The method of claim 1, wherein determining the modal deformation basis set includes treating image-space motion in a 2D image plane as a linear projection of any linear motion of the target object in 3D space.

5. The method of claim 1, wherein determining the modal deformation basis set includes applying additional information about the real-world target object or applying additional information about real-world forces acting on the real-world target object during an acquisition of the sequence of images.

6. The method of claim 1, wherein determining the modal deformation basis set from the sequence of images includes extracting motion signals representative of the real-world motions from the sequence of images.

7. The method of claim 1, wherein determining the modal deformation basis set includes distinguishing between independent motion modes by relying on separation of the modes in the frequency domain.

8. The method of claim 1, wherein creating synthesized deformations includes calculating virtual, 3D deformations.

9. The method of claim 1, wherein the real-world motions of the real-world target object are 3D motions, wherein the modal deformation basis set is a 2D basis set, and wherein creating the synthesized deformations includes calculating synthesized 2D deformations based on the 2D basis set.

10. The method of claim 1, wherein creating the synthesized deformations includes warping an image representing a rest state of the real-world target object.

11. The method of claim 10, wherein warping the image representing the rest state includes applying a displacement field calculated as a superposition of mode shapes weighted by respective modal coordinates without relying on a complex steerable pyramid (CSP) for synthesis.

12. The method of claim 1, wherein the virtual input force is a point force specified to be applied at a given point on the real-world target object in a specified direction, and wherein creating the synthesized, image-space deformations includes calculating the image-space deformations in response to the point force.

13. The method of claim 1, wherein the virtual input force is a point position or point velocity specified for a given point on the target object, and wherein creating the synthesized, image-space deformations includes calculating the image-space deformations in response to the point position or point velocity specified.

14. The method of claim 1, wherein the virtual input force includes a force from a hypothetical object interacting with the real-world target object, the method further including enabling generation of an animation of the hypothetical object interacting with the real-world target object.

15. The method of claim 1, wherein the virtual input force is applied to the target object by a real-world source object, the method further including enabling generation of a synthesized video including representations of the synthesized, image-space deformations of the real-world target object interacting with the real-world source object based on the virtual input force.

16. The method of claim 1, wherein the virtual input force is a new force differing from any force observed acting on the real-world target object in the sequence of images.

17. The method of claim 1, further including enabling a user to specify the virtual input force using a graphical user interface (GUI).

18. An apparatus for modeling deformations of a real-world target object, the apparatus comprising:
  memory configured to store a sequence of images of a real-world target object; and
  a processor configured to:
    determine, from the sequence of images of the real-world target object, a modal deformation basis set in image space and representative of real-world motions of the real-world target object, by performing peak selection from a temporal frequency power spectrum of the sequence of images;
    extract, from the sequence of images, a static representation of one or more vibration modes of the real-world target object;
    create synthesized, image-space deformations of the real-world target object, based on the modal deformation basis set, in response to a virtual input force applied to the real-world target object, by applying the virtual input force to the basis set in modal coordinates; and
    output one or more synthesized images showing the static representation of the one or more vibration modes of the real-world target object with the synthesized, image-space deformations applied thereto.

19. The apparatus of claim 18, wherein the processor is further configured to determine modal deformation basis set by enabling selection of basis frequencies from an average power spectrum of frequencies averaged over at least a spatial portion of the sequence of images.

20. The apparatus of claim 18, wherein the processor is further configured to determine the modal deformation basis set by calculating (2D), non-orthogonal projections of orthogonal, three-dimensional (3D) deformation modes.

21. The apparatus of claim 18, wherein the processor is further configured to determine the modal deformation basis set by treating image-space motion in a 2D image plane as a linear projection of any linear motion of the target object in 3D space.

22. The apparatus of claim 18, wherein the processor is further configured to determine the modal deformation basis set by applying additional information about the real-world target object or applying additional information about a real-world force acting on the real-world target object during an acquisition of the sequence of images.

23. The apparatus of claim 18, wherein the processor is further configured to determine the modal deformation basis set from the sequence of images by extracting motion signals representative of the real-world motions from the sequence of images.

24. The apparatus of claim 18, wherein the processor is further configured to determine the modal deformation basis set by distinguishing between independent motion modes by relying on separation of the modes in the frequency domain.

25. The apparatus of claim 18, wherein the processor is further configured to create the synthesized deformations by calculating virtual, 3D deformations.

26. The apparatus of claim 18, wherein the real-world motions of the real-world target object are 3-D motions, wherein the modal deformation basis set is a 2D basis set, and wherein the processor is further configured to create the synthesized deformations by calculating synthesized 2D deformations based on the 2D basis set.

27. The apparatus of claim 18, wherein the processor is further configured to synthesize the image-space deformations by warping an image representing a rest state of the real-world target object.

28. The apparatus of claim 27, wherein the processor is further configured to warp the image representing the rest state of the real-world target object by applying a displacement field calculated as a superposition of mode shapes weighted by respective modal coordinates without relying on a complex steerable pyramid (CSP) for synthesis.

29. The apparatus of claim 18, wherein the virtual input force is a point force specified to be applied at a given point on the real-world target object in a specified direction, and wherein the processor is further configured to create the synthesized, image-space deformations in response to the point force.

30. The apparatus of claim 18, wherein the virtual input force is a point position or point velocity specified for a given point on the target object, and wherein the processor is further configured to create the synthesized, image-space deformations in response to the point position or point velocity specified.

31. The apparatus of claim 18, wherein the virtual input force includes a force from a hypothetical object interacting with the real-world target object, and wherein the processor is further configured to enable generation of an animation of the hypothetical object interacting with the real-world target object.

32. The apparatus of claim 18, wherein the virtual input force is applied to the target object by a real-world source object, and wherein the processor is further configured to enable generation of a synthesized video including representations of the synthesized, image-space deformations of the real-world target object interacting with the real-world source object based on the virtual input force.

33. The apparatus of claim 18, wherein the virtual input force is a new force differing from any force acting on the real-world target object in the sequence of images.

34. The apparatus of claim 18, wherein the processor is further configured to enable a user to specify the virtual input force using a graphical user interface (GUI).

35. A synthesized image prepared by a process comprising:
  determining, from a sequence of images of a real-world target object, a modal deformation basis set in image space and representative of real-world motions of the real-world target object, by performing peak selection from a temporal frequency power spectrum of the sequence of images;
  extracting, from the sequence of images, a static representation of one or more vibration modes of the real-world target object;
  creating synthesized, image-space deformations of the real-world target object, based on the modal deformation basis set, in response to a virtual input force applied to the real-world target object, by applying the virtual input force to the basis set in modal coordinates; and
  outputting one or more synthesized images showing the static representation of the one or more vibration modes of the real-world target object with the synthesized, image-space deformations applied thereto.

* * * * *